(12) United States Patent
Kamio et al.

(10) Patent No.: US 11,386,700 B2
(45) Date of Patent: Jul. 12, 2022

(54) FACE DETECTION SYSTEM

(71) Applicant: PANASONIC I-PRO SENSING SOLUTIONS CO., LTD., Fukuoka (JP)

(72) Inventors: Takashi Kamio, Tokyo (JP); Koji Kawamoto, Fukuoka (JP); Masashige Tsuneno, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 17/169,982

(22) Filed: Feb. 8, 2021

(65) Prior Publication Data

US 2021/0271855 A1 Sep. 2, 2021

(30) Foreign Application Priority Data

Feb. 28, 2020 (JP) .............................. JP2020-033673

(51) Int. Cl.
 *G06V 40/16* (2022.01)
 *H04N 7/18* (2006.01)
 *H04N 5/765* (2006.01)
(52) U.S. Cl.
 CPC .......... *G06V 40/166* (2022.01); *G06V 40/172* (2022.01); *H04N 5/765* (2013.01); *H04N 7/183* (2013.01)
(58) Field of Classification Search
 CPC .......... G06K 9/00255; G06K 9/00288; H04N 5/765; H04N 7/18
 See application file for complete search history.

(56) References Cited

U.S. PATENT DOCUMENTS

| | | | | |
|---|---|---|---|---|
| 2008/0250037 | A1* | 10/2008 | Date ....................... | G06F 16/48 707/E17.031 |
| 2010/0104146 | A1* | 4/2010 | Momosaki ........... | G11B 27/034 382/118 |
| 2014/0328570 | A1* | 11/2014 | Cheng .................. | H04N 21/233 386/241 |
| 2015/0356356 | A1* | 12/2015 | Han ....................... | G11B 27/34 386/241 |

(Continued)

FOREIGN PATENT DOCUMENTS

JP 2010-103765 5/2010

*Primary Examiner* — Sunghyoun Park
(74) *Attorney, Agent, or Firm* — Greenblum & Bernstein, P.L.C.

(57) ABSTRACT

A face detection system includes a terminal device and a server communicably connected to the terminal device. The terminal device acquires a recorded video data file selected by user operation and transmits it to the server. The server converts the received recorded video data file into recorded video data having a predetermined format, detects a face of one or more persons based on the converted recorded video data, generates one or more face-cut images by cutting out a region of the detected face, associates information of an image capturing time point at which a person corresponding to the face cut-out image is captured with the face cut-out image, and transmits the associated information to the terminal device. The terminal device displays a thumbnail image of the received face cut-out image and information of the image capturing time point side by side in a time series on a monitor.

16 Claims, 13 Drawing Sheets

(56) References Cited

U.S. PATENT DOCUMENTS

2018/0035074 A1* 2/2018 Barnes, Jr. ............ G06V 40/172
2019/0286893 A1* 9/2019 Adachi .................... G06T 5/50
2020/0272826 A1* 8/2020 Hasegawa .......... G06K 9/00275

* cited by examiner

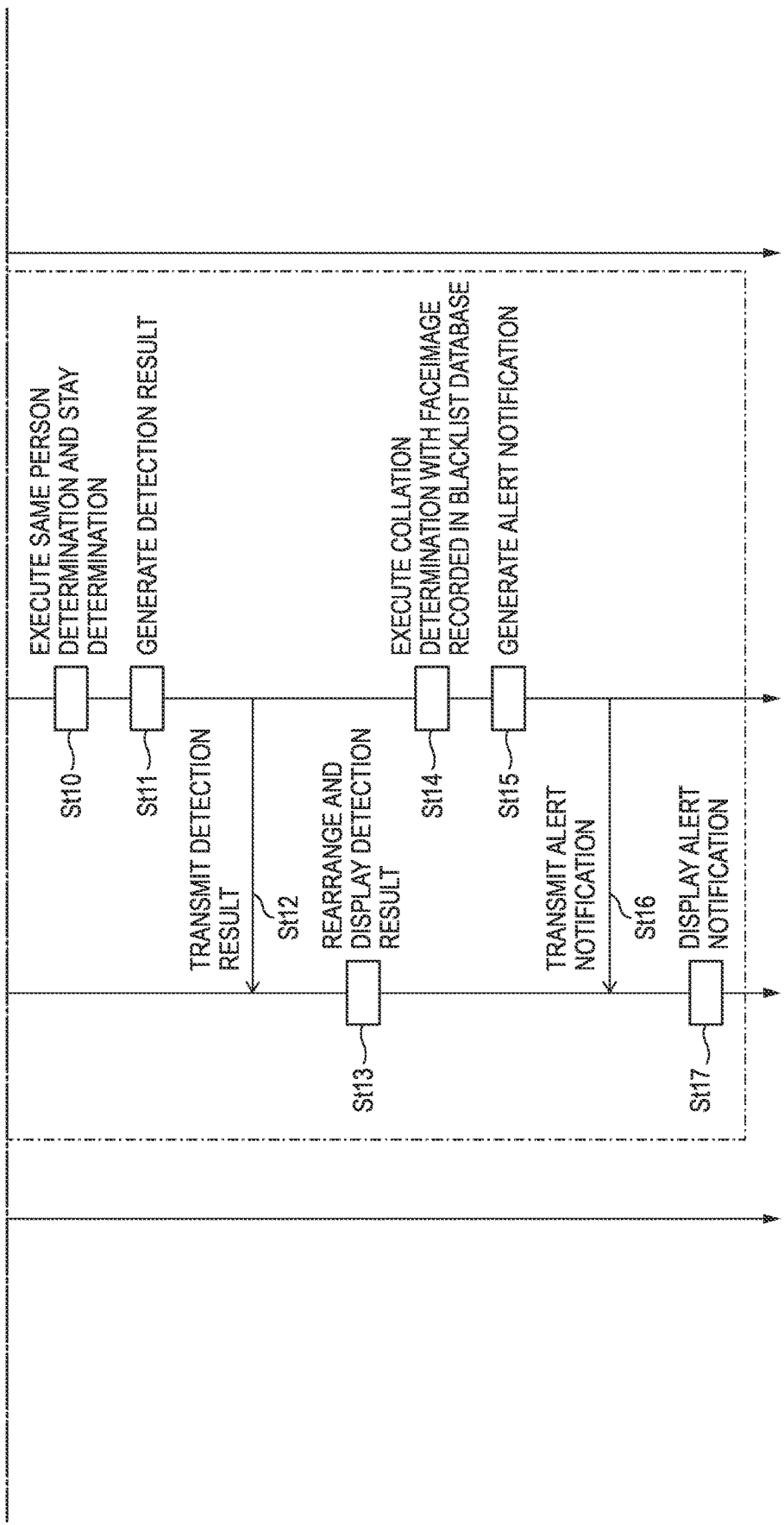

FACE DETECTION SYSTEM

CROSS-REFERENCE TO RELATED APPLICATIONS

This application is based on and claims priority under 35 USC 119 from Japanese Patent Application No. 2020-033673 filed on Feb. 28, 2020, the contents of which are incorporated herein by reference.

TECHNICAL FIELD

The present disclosure relates to a face detection system.

BACKGROUND ART

Patent Literature 1 discloses an electronic device that extracts, for each video data file, a face image group including a plurality of face images of a person who frequently appears among persons in videos of video data files, and displays the face image group extracted for each of one or more selected video data files side by side on a selection screen on which one or more video data files can be selected from the plurality of video data files.

CITATION LIST

Patent Literature

Patent Literature 1: JP-A-2010-103765

SUMMARY OF INVENTION

According to Patent Literature 1 described above, by displaying the face image group of persons who frequently appear in a video, it is possible to present a main person captured on each video data file and a relation between the video data files to a user. However, in the configuration of Patent Literature 1, in a case of confirming an image capturing time point at which an image of a person included in the face image group is captured by a camera or the like, a user must reproduce and confirm the video data files one by one, which is not efficient since considerably complicated work is forced. In addition, in the configuration of Patent Literature 1, it is not assumed to present a person who appears infrequently to the user.

The present disclosure has been made in view of the above-described conventional circumstances of the related art, and an object thereof is to provide a face detection system that visualizes a face image of a person reflected on at least one recorded video data file which is captured in the past and an image capturing time point at which an image of the person is captured in association with each other, and efficiently supports a monitoring service for the person.

The present disclosure provides a face detection system includes a terminal device that is capable of acquiring at least one recorded video data file and a server that is communicably connected to the terminal device. The terminal device acquires the recorded video data file selected by user operation and transmits the recorded video data file to the server. The server converts the received recorded video data file into recorded video data having a predetermined format, detects a face of one or more persons based on the converted recorded video data, generates one or more face-cut images by cutting out a region of the detected face, associates information of an image capturing time point at which a person corresponding to the face cut-out image is captured with the face cut-out image, and transmits the associated information to the terminal device. The terminal device displays a thumbnail image of the received face cut-out image and information of the image capturing time point side by side in a time series on a monitor.

According to the present disclosure, it is possible to visualize a face image of a person reflected on at least one recorded video data file which is captured in the past and an image capturing time point at which an image of the person is captured in association with each other, and to efficiently support a monitoring service for the person.

BRIEF DESCRIPTION OF DRAWINGS

FIG. 8 is an example of a screen showing a search result based on a face image input by a user.

FIG. 10 is an example of a screen which displays search results in a merged manner.

DESCRIPTION OF EMBODIMENTS

Hereinafter, embodiments that specifically disclose configuration and action of a face detection system according to the present disclosure are described in detail with reference to drawings as appropriate. However, detailed description more than necessary may be omitted. For example, detailed description of an already well-known matter or repeated description of substantially the same configuration may be omitted. This is to avoid unnecessary redundancy of the following description and to facilitate understanding of those skilled in the art. The accompanying drawings and the following description are provided for thoroughly understanding the present disclosure by those skilled in the art, and are not intended to limit the subject according to the claims.

Figure 1:
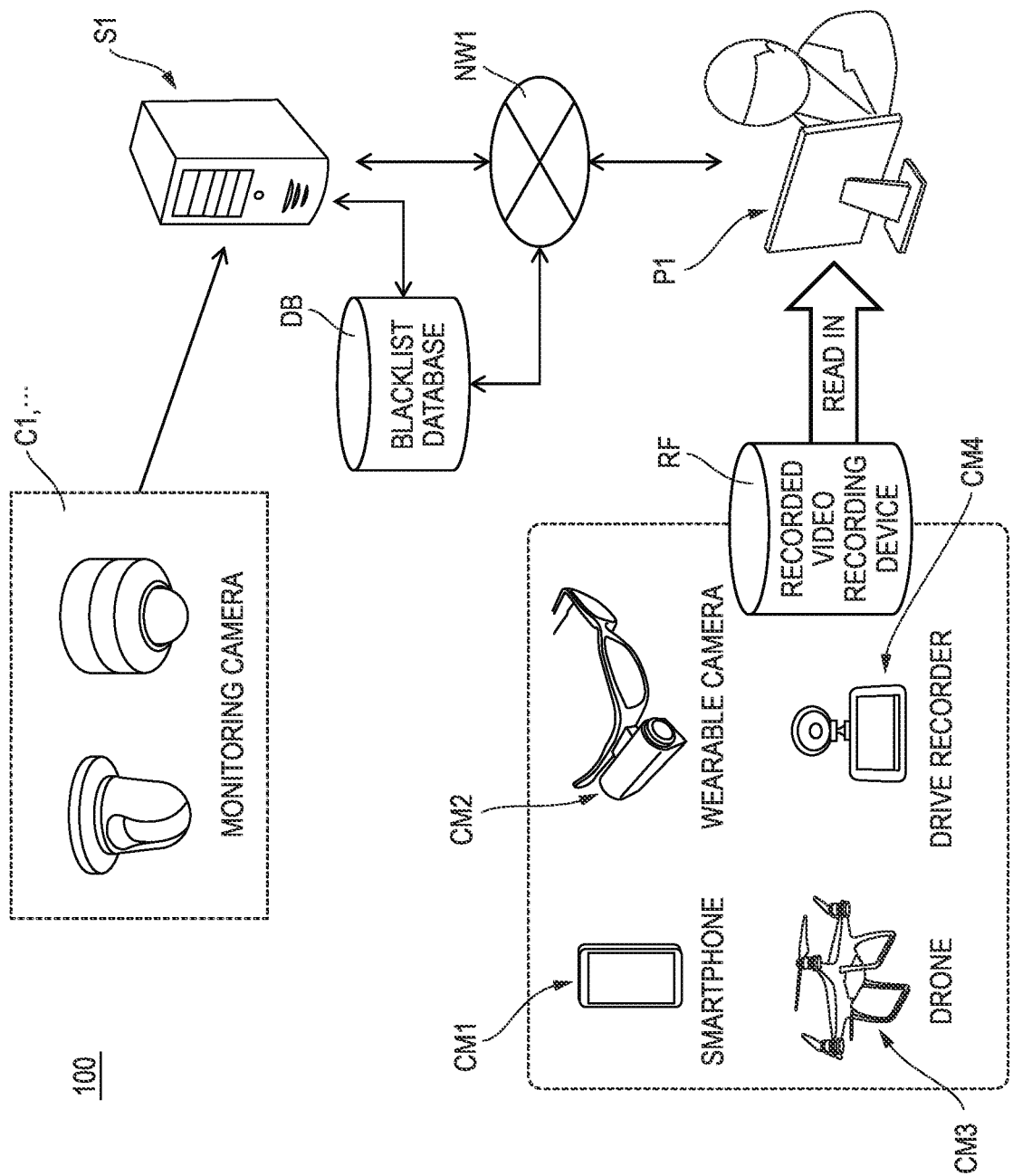
FIG. 1 is a diagram illustrating an overall configuration example of a face detection system according to an embodiment.

FIG. 1 is a diagram illustrating an overall configuration example of a face detection system 100 according to an embodiment. The face detection system 100 according to the embodiment is a system that detects a person reflected on one or more recorded videos or live videos captured by various cameras, and presents a user a face cut-out image generated by cutting out a detected person in a region containing at least a face and information on an image capturing time point at which the face cut-out image is captured (such as a staff of a police station, a police officer, a staff of a security company, or an administrator). The face detection system 100 includes at least a recorded video recording device RF, a terminal device P1, and a server S1.

Also, the camera includes a camera in which position information whose image is to be captured changes by movement of a person, a vehicle, a flying object, or the like as a camera CM1 included in a smartphone, a wearable camera CM2, a drone CM3, and a drive recorder CM4, or the like, and a camera installed with a fixed field angle (that is, position information whose image is to be captured does not change) as, for example, monitoring cameras C1, . . . , and records a captured video including information of the image capturing time point and position information whose image has been captured.

The recorded video recording device RF is, for example, a memory, an SD (registered trademark) card, a universal serial bus (USB) memory, a recorder, a hard disk drive (HDD), or the like, and records a recorded video data file captured by the camera described above. The recorded video recording device RF is communicably connected with the terminal device P1 via a wired cable such as a universal serial bus (USB) cable or a connector such as a USB connector, and transmits the recorded video data file to the terminal device P1. In the example shown in FIG. 1, the number of the recorded video recording device RF is one, but may be plural.

The terminal device P1 is, for example, a personal computer (PC), a notebook PC, a tablet terminal, or the like, and is connected with the recorded image recording device RF in which a recorded video is recorded via a wired cable such as a universal serial bus (USB) cable or a connector such as a USB connector so as to be capable of data communication. The terminal device P1 is connected with the server S1 via a network NW1 so as to be capable of wired or wireless communication. The wireless communication referred to here is communication via a wireless LAN such as Wi-Fi (registered trademark).

The terminal device P1 includes a user interface (UI) that accepts user operations, and reads each of a plurality of recorded video data files selected by a user from the recorded video recording device RF. The terminal device P1 transmits each of the plurality of read recorded video data files to the server S1. In addition, the terminal device P1 receives an input operation from the user for search conditions (for example, a face image of a person to be searched) related to a person to be searched from each of a plurality of recorded videos, and transmits the received search conditions to the server S1.

Further, the terminal device P1 acquires a detection result transmitted from the server S1, and displays, on a monitor, thumbnail data in which a thumbnail image of one or more face cut-out images included in the detection result is paired with the information of the image capturing time point. Based on the user operation, the terminal device P1 rearranges and displays each of the thumbnail images in a time series or in descending order of a distance between a reference position designated by the user and a position at which the face cut-out image is captured. When the terminal device P1 receives, from the server S1, an alert notification screen indicating that a person similar to or the same as a target registered in advance has been detected, the alert notification screen is displayed on the monitor.

Furthermore, the terminal device P1 receives an input operation from the user for display conditions of the detection result transmitted from the server S1. The display conditions referred to here are conditions for displaying each of the plurality of face cut-out images included in the detection result on the monitor, for example, conditions for extracting a specific face cut-out image from each of the plurality of face cut-out images included in the detection result, or conditions for rearranging each of the plurality of face cut-out images in predetermined conditions. The terminal device P1 extracts a face cut-out image to be a target of the display conditions based on the received display conditions or rearranges and displays each of the plurality of face cut-out images on the monitor based on the display conditions.

The server S1 is connected with the terminal device P1 and with the monitoring camera C1, . . . via the network NW1 so as to be capable of data communication. Although FIG. 1 shows an example in which the server S1 is connected with each of a plurality of monitoring cameras C1, . . . , the number of monitoring cameras may be one. In addition, each of the monitoring cameras C1, . . . is not an essential component, and may not be connected.

The server S1 detects a person from the recorded video data file or the live video, generates a face cut-out image containing at least a face region of the detected person, associates the information of an image capturing time point, the position information, and information of the recorded video data file or the monitoring camera which is a detection source with the generated face cut-out image, and transmits the associated information as detection results to the terminal device P1.

Also, the face cut-out image generated by the server S1 is not limited to a face image. The face cut-out image may be generated by containing at least a face region of a person, and may be, for example, an upper body image or a whole body image.

Each of the plurality of monitoring cameras C1, . . . is a camera installed with a fixed field angle, and is connected with the server S1 to be capable of data communication. Each of the plurality of monitoring cameras C1, . . . transmits the live video being captured to the server S1. As described above, the number of the plurality of monitoring cameras C1, . . . may be zero or one. Position information in which each of the plurality of monitoring cameras C1, . . . is installed is stored in the server S1 in association with identification information (manufacture number, management number, identification number, name, or the like) of each of the plurality of monitoring cameras C1, . . . .

A blacklist database DB is generated and transmitted by the terminal device P1 in advance, associates related information related to an incident or the like generated for each target (namely person) which is a search or investigation target of an incident by a police officer, an administrator, a security guard, or the like with a registered face image of the target, and registers (stores) the related information and the registered face image. It is sufficient that the registered face image is an image containing a face region of a person, and may be, for example, an upper body image or a whole body image.

The blacklist database DB is referred to by the server S1 when the recorded video data is read from the terminal device P1 or the live video is read in from each of the monitoring cameras C1, . . . and a face cut-out image of a person reflected on the video data is generated. The server S1 refers to the blacklist database DB, and executes collation determination on whether or not a person similar to or coinciding with the person in the face cut-out image is registered.

Although FIG. 1 shows an example in which the blacklist database DB is connected with the server S1 so as to be capable of data communication, the blacklist database DB may be included in a configuration of the server S1.

Figure 2:
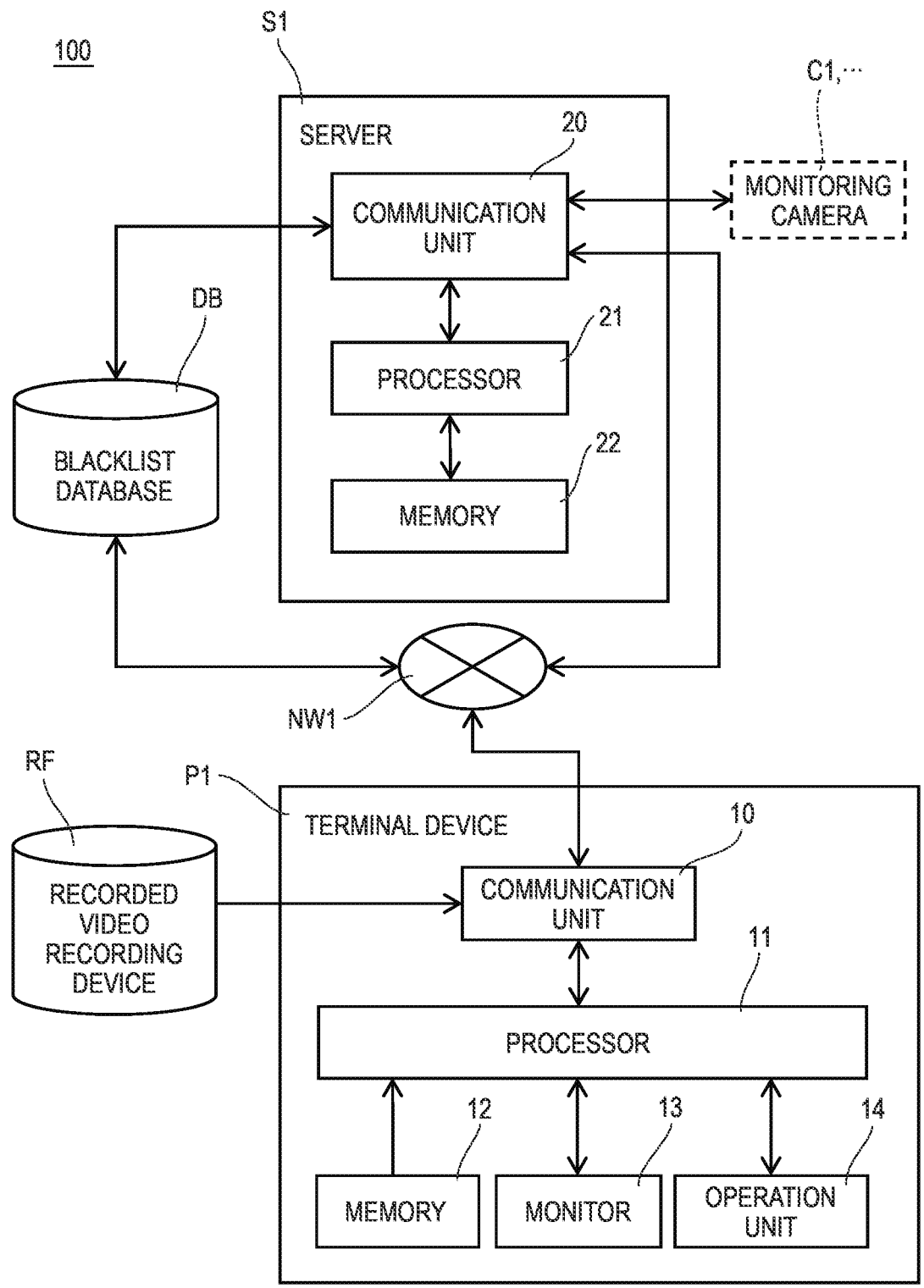
FIG. 2 is a diagram illustrating internal configuration examples of a terminal device and a server in the face detection system according to the embodiment.

FIG. 2 is a diagram illustrating an internal configuration example of the terminal device P1 and the server S1 in the face detection system 100 according to the embodiment.

The terminal device P1 includes a communication unit 10, a processor 11, a memory 12, a monitor 13, and an operation unit 14.

The communication unit 10 is connected with the recorded video recording device RF and a communication unit 20 in the server S1 so as to be capable of data communication. The communication unit 10 transmits, to the server S1, a search request (control signal) including the recorded video data file designated by the user and received by the operation unit 14 or the input search conditions. Further, the communication unit 10 receives the detection result from the server S1 and inputs the detection result to the processor 11.

The processor 11 is configured using, for example, a central processing unit (CPU) or a field programmable gate array (FPGA), and performs various types of processing and control in cooperation with the memory 12. Specifically, the processor 11 refers to a program and data held in the memory 12, and executes the program to realize a function of each unit.

The processor 11 generates a control signal based on a user operation received by the operation unit 14. In addition, the processor 11 outputs to the monitor 13 and displays thumbnail data (for example, thumbnail data Sm11 in FIG. 4) in which a thumbnail image of the face cut-out image included in the detection result transmitted from the server S1 (for example, a thumbnail image Smn1 in FIG. 4) is paired with the information of the image capturing time point (for example, image capturing time point information Smt1 in FIG. 4) on the monitor 13. In a case where the display conditions are input by the user, the processor 11 extracts or rearranges each of the plurality of face cut-out images included in the display target based on the display conditions, and outputs to the monitor 13 and displays the face cut-out image.

The memory 12 includes, for example, a random access memory (RAM) serving as a work memory used when various types of processing of the processor 11 are executed, and a read only memory (ROM) that stores data and a program which define a motion of the processor 11. Data or information generated or acquired by the processor 11 is temporarily stored in the RAM. A program that defines the motion of the processor 11 is written in the ROM.

The monitor 13 includes a display such as a liquid crystal display (LCD) or an organic electroluminescence (EL). The monitor 13 displays the detection result, a search result, or an alert notification transmitted from the server S1.

The operation unit 14 is a user interface that receives user operation, and includes a mouse, a keyboard, a touch panel, a touch pad, a pointing device, and the like. The operation unit 14 outputs a signal to the processor 11 based on the user operation. The operation unit 14 receives selection operation of a user related to a recorded video data file to be read in, input operation of a user related to the predetermined search conditions, and the like.

Next, an internal configuration of the server S1 is described. The server S1 includes a communication unit 20, a processor 21, and a memory 22.

The communication unit 20 is connected with the communication unit 10 in the terminal device P1, the blacklist database DB, and each of the plurality of monitoring cameras C1, . . . so as to be capable of data communication. The communication unit 20 outputs the recorded video data file transmitted from the terminal device P1 or the search request (control signal) including the search conditions to the processor 21. The communication unit 20 outputs data of the live video transmitted from each of the plurality of monitoring cameras C1, . . . to the processor 21. The communication unit 20 transmits the detection result or the alert notification generated by the processor 21 to the communication unit 10 in the terminal device P1.

The processor 21 includes, for example, a CPU or an FPGA, and performs various types of processing and control in cooperation with the memory 22. Specifically, the processor 21 refers to a program and data held in the memory 22, and executes the program to realize a function of each unit.

When the processor 21 receives the recorded video data file transmitted from the terminal device P1 or the live video data transmitted from each of the plurality of monitoring cameras C1, . . . , the processor 21 converts the recorded video data file or the live video data into recorded video data having a predetermined format. Specifically, the processor 21 decodes the recorded video data file or the live video data, and the recorded video data file or the live video data is expanded into a plurality of pieces of image data.

The processor 21 executes face detection for detecting a face of a person using the converted recorded video data (that is, a plurality of pieces of image data), and generates a face cut-out image where a region containing at least a face region of the person is cut out based on the detection result. In addition, the processor 21 refers to meta data or the like stored in association with image data where the detected person is reflected, extracts information of an image capturing time point at which the image data is captured, position information in which the image data is captured, the recorded video data file or monitoring camera information which is a detection source, and stores the extracted information in association with the generated face cut-out image. Here, the position information is position information where the camera is installed in a case of being captured by the camera installed at a predetermined position as each of the plurality of monitoring cameras C1, . . . .

The processor 21 determines whether or not a person reflected on each of the generated plurality of face cut-out images is the same person or a similar person, and generates a similar face image group including each of the plurality of face cut-out images determined to be the same person or a similar person. The generated similar face image group is transmitted from the server S1 to the terminal device P1 via the network NW1, surrounded by a frame showing that the person is determined to be the same person, and displayed on the monitor 13.

Also, the frame may be one frame border (see FIG. 4) surrounding all face cut-out images included in the similar face image group, or may be a closing line (the same line color, the same line type, or the like) capable of identifying only the plurality of face cut-out images included in the similar face image group among the face cut-out images of all the detected persons.

In addition, the processor 21 determines whether or not each of the plurality of face cut-out images included in the similar face image group is continuously captured for a predetermined time or more. In a case where it is determined that the images are continuously captured for the predetermined time or more, the processor 21 determines that the person in the face cut-out image stays, generates a staying face image group including each of the plurality of face cut-out images captured during the predetermined time, and transmits the staying face image group to the terminal device. The generated staying face image group is transmitted from the server S1 to the terminal device P1 via the network NW1, and is displayed on the monitor 13 in the terminal device P1.

When the terminal device P1 selects the staying face image group by user operation, a face cut-out image captured first (that is, the image capturing time point is the oldest) and a face cut-out image captured last (that is, the image capturing time point is the newest) among each of the plurality of face cut-out images included in the staying face image group are displayed as thumbnails on the monitor 13.

Further, the processor 21 refers to the blacklist database DB, and executes collation determination between the registered face image of a target being registered and each of all the generated face cut-out images. As a result of the collation determination, in a case where there is a face image to be collated, the processor 21 generates an alert notification including the registered face image of the registered target and the collated face cut-out image, and transmits the alert notification to the terminal device P1. The generated alert notification is displayed on the monitor 13 in the terminal device P1.

The memory 22 includes, for example, a RAM as a work memory used when various types of processing of the processor 21 are executed, and a ROM that stores a program and data which define the motion of the processor 21. Data or information generated or acquired by the processor 21 is temporarily stored in the RAM. A program that defines the motion of the processor 21 is written in the ROM. The memory 22 stores installation position information in which each of the plurality of monitoring cameras C1, ... is installed in association with identification information of each of the plurality of monitoring cameras C1, ....

Figure 3A:
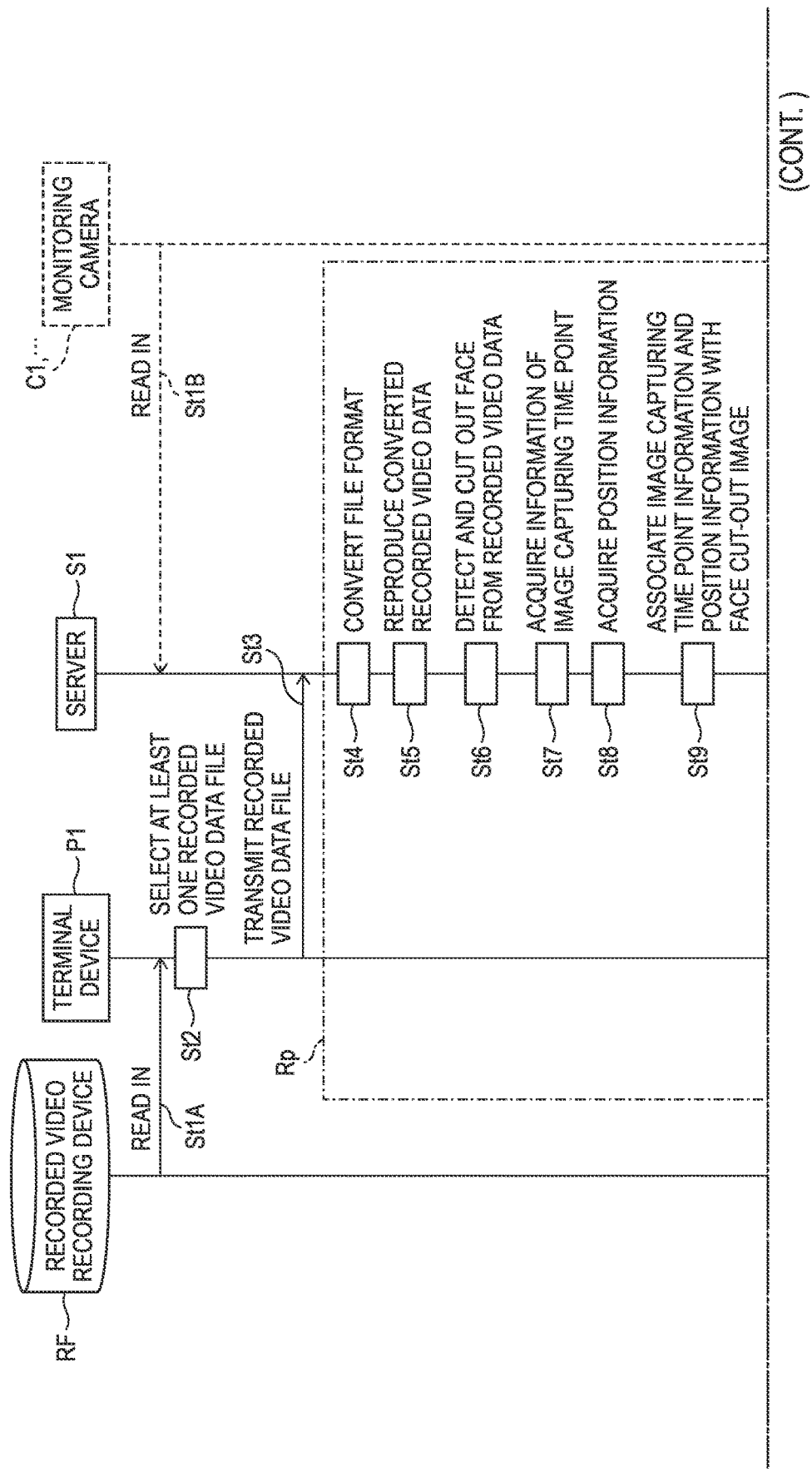
FIG. 3A is a sequence diagram illustrating a motion procedure example of the face detection system according to the embodiment.
Figure 3B:
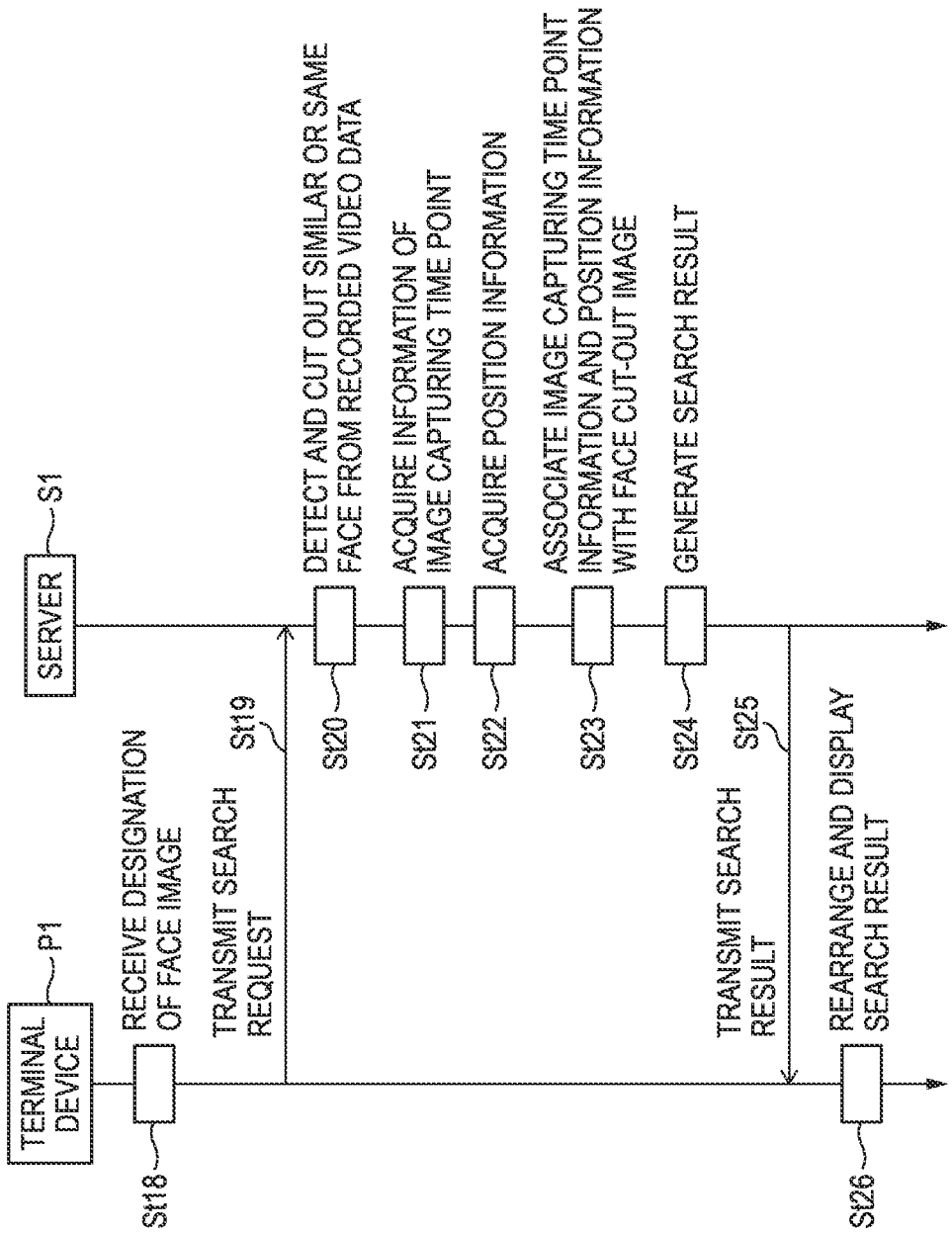
FIG. 3B is a sequence diagram illustrating a search procedure example of the face detection system according to the embodiment.

A motion procedure example of the face detection system 100 according to the embodiment is described with reference to FIG. 3A and FIG. 3B. FIG. 3A is a sequence diagram illustrating a motion procedure example of the face detection system 100 according to the embodiment. FIG. 3B is a sequence diagram illustrating a search procedure example of the face detection system 100 according to the embodiment. In FIG. 3A, an example in which the recorded video data file is read in from the recorded video recording device RF, the live video data is read in from each of the plurality of monitoring cameras C1, ..., and face detection is executed is described, but it is needless to say that the motion procedure of the face detection system 100 is not limited thereto. The face detection system 100 may read in at least one recorded video data file and execute face detection of a person reflected on the recorded video data by using the read-in recorded video data file.

The terminal device P1 reads in one or more recorded video data files from the recorded video recording device RF connected so as to be capable of data communication (St1A). As a recorded video data file to be read in, only the recorded video data file selected (designated) by the user operation may be read in.

The server S1 reads in data of one or more live videos from each of the plurality of monitoring cameras C1, ... communicably connected to each other (SUB).

The terminal device P1 receives selection operation by the user on the recorded video data file desired to be transmitted to the server S1 and subjected to face detection among the read-in recorded video data files (St2). The terminal device P1 transmits one or more recorded video data files selected (designated) by the user to the server S1 via the network NW1 (St3).

The server S1 receives one or more recorded video data files transmitted from the terminal device P1. The server S1 converts the one or more recorded video data files and live video data into recorded video data having a predetermined format (St4).

The server S1 reproduces the converted recorded video data (St5), and detects a person from the recorded video data. The server S1 generates a face cut-out image in which a range containing a face region of the detected person is cut out (St6). The range to be cut out here may be, for example, an upper body or a whole body of the person. That is, the face cut-out image may be an upper body cut-out image cut out by containing the upper body region of the detected person, or may be a whole body cut-out image cut out by containing the whole body region of the detected person.

The server S1 acquires information of the image capturing time point at which an image of a person corresponding to the generated face cut-out image is captured from the meta data associated with the recorded video data (St7). In addition, the server S1 acquires position information in which an image of a person corresponding to the generated face cut-out image is captured from the meta data associated with the recorded video data (St8). The server S1 records the acquired image capturing time point information and position information in association with the face cut-out image (St9).

The sever S1 executes the same person determination of whether or not a person reflected on each of the generated plurality of face cut-out images is the same person or a similar person (St10). The server S1 extracts each of the plurality of face cut-out images determined to be the same person or a similar person, and generates a similar face image group including each of the plurality of face cut-out images.

In addition, the server S1 executes stay determination of whether or not each of the plurality of face cut-out images included in the similar face image group is continuously captured for a predetermined time or more (St10). In a case where it is determined that the persons corresponding to the plurality of face cut-out images extracted as the similar face image group are continuously captured for the predetermined time or more, the server S1 determines that the person in the face cut-out image stays. The server S1 extracts each of the plurality of face cut-out images captured during the predetermined time, and generates a staying face image group including each of the plurality of face cut-out images.

The server S1 transmits to the terminal device P1 a detection result including each of the plurality of face cut-out images which associate the acquired image capturing time point information and position information (St10). In a case where at least any one of the similar face image group or the staying face image group is generated as a result of the same person determination or stay determination in step St9, the server S1 generates a detection result including one or more generated similar face image groups or staying face image groups (St11). The server S1 transmits the generated detection result to the terminal device P1 (St12).

The terminal device P1 generates thumbnail data in which the thumbnail image of each of the plurality of face cut-out images included in the detection result transmitted from the server S1 is paired with the information of the image capturing time point at which an image of the corresponding person is captured, and displays the thumbnail data on the monitor 13 (St13).

In addition, the server S1 refers to the blacklist database DB connected so as to be capable of data communication, and executes collation determination for collating each of the registered face images of the targets registered in the blacklist database DB with each of the plurality of generated face cut-out images (St14).

In the collation determination processing in step St14, in a case where it is determined that there is a face cut-out image to be collated with the registered face image of the target among each of the plurality of face cut-out images, the server S1 generates an alert notification screen including the face cut-out image collated with the registered face image of the target (St15). The server S1 transmits the generated alert notification screen to the terminal device P1 (St16).

The terminal device P1 displays the alert notification screen transmitted from the server S1 on the monitor 13 (St17).

In addition, in a case where designation of a face image of a person desired to be detected is received by user operation (St18), the terminal device P1 generates a search request for searching for a person corresponding to the face image, and transmits the search request to the server S1 (St19).

When the server S1 detects a person similar to or the same as the person corresponding to the face image transmitted from the terminal device P1 from the recorded video data, the server S1 generates a face cut-out image in which a face region of the detected person is cut out (St20). The server S1 acquires information of the image capturing time point at which an image of a person corresponding to the generated face cut-out image is captured from the meta data associated with the recorded video data (St21). In addition, the server S1 acquires position information in which an image of a person corresponding to the generated face cut-out image is captured from the meta data associated with the recorded video data (St22). The server S1 records the acquired image capturing time point information and position information in association with the face cut-out image (St23).

In a case where the server S1 stores each of the plurality of face cut-out images generated in the processing of step St6 to step St9 even after the detection result is transmitted to the terminal device P1, the server S1 may execute the same person determination on each of the plurality of face cut-out images based on the face image transmitted from the terminal device P1. That is, in such a case, processing of step St21 to step St23 is omitted.

The server S1 generates, as the detection result, a similar face image group including one or more face images determined to be a person similar to or the same as the person corresponding to the face image transmitted from the terminal device P1 (St24). The server S1 transmits the generated detection result (similar face image group) to the terminal device P1 (St25).

The terminal device P1 displays, on the monitor 13, the thumbnail data in which the thumbnail image included in the detection result (similar face image group) transmitted from the server S1 is paired with the image capturing time point information (St26).

Figure 4:
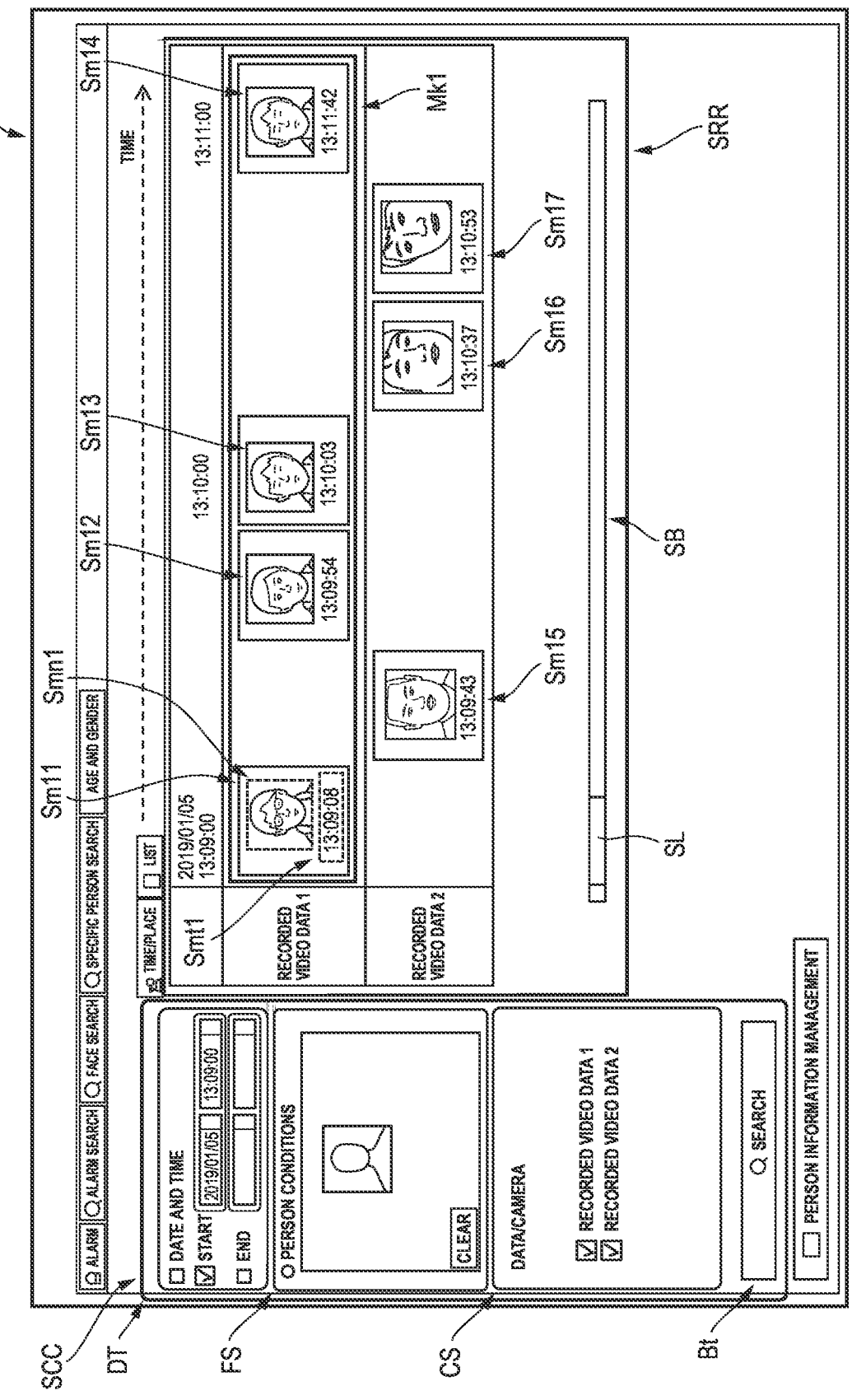
FIG. 4 is an example of a screen showing a detection result.

The detection result generated by using each of the plurality of recorded video data files is described with reference to FIG. 4. FIG. 4 is an example of a screen Mn1 showing the detection result. Reference signs of the thumbnail image Smn1 of the face cut-out image and the image capturing time point information Smt1 at which an image of the person corresponding to the face cut-out image is captured illustrate only the thumbnail data Sm11 in FIG. 4, and are omitted in FIG. 6 to FIG. 10 showing other thumbnail data and other screen examples.

In the example shown in FIG. 4, each of a plurality of pieces of thumbnail data Sm11, Sm12, Sm13, and Sm14 is data in which the thumbnail images of the plurality of face cut-out images generated by using the recorded video data indicated by "recorded video data 1" are paired with the image capturing time point information, and is a similar face image group determined to be the same person by the same person determination executed by the server S1. In addition, each of a plurality of pieces of thumbnail data Sm15, Sm16, and Sm17 is data in which the thumbnail images of the plurality of face cut-out images generated by using the recorded video data shown by "recorded video data 2" is paired with the image capturing time point information.

The terminal device P1 generates a screen for presenting the detection result to the user based on the detection result transmitted from the server S1, and outputs and displays the screen on the monitor 13. In a case where the terminal device P1 receives an alert notification screen AR from the server S1, the terminal device P1 outputs and displays the alert notification screen AR on the monitor 13 (see FIG. 11).

As shown in FIG. 4, the screen generated by the terminal device P1 includes at least an input field SCC in which search conditions or display conditions are input, and a display field SRR for displaying each of the plurality of face cut-out images as a detection result.

The input field SCC includes, for example, any one of a date and time input field DT, a person condition input field FS, a data selection field CS, and a place selection field PS (see FIG. 9 to FIG. 11), and an execution button Bt, and receives input operation related to the search conditions or the display conditions by the user.

The date and time input field DT receives input operation by the user with respect to display conditions for limiting (selecting) a face cut-out image to be displayed in the display field SRR among each of a plurality of face cut-out images received as a detection result based on information of the image capturing time point at which an image of the person corresponding to the face cut-out image is captured. The date and time input field DT includes an input field related to a start date and time and an input field related to an end time point. The terminal device P1 extracts the face cut-out image having information of an image capturing time point between a date and time input in the input field related to the start date and time and a date and time input in the input field related to the end time point, and displays the pair of the thumbnail image of the extracted face cut-out image and the information of the image capturing time point in the display field SRR.

In a case where a date and time is input only to the input field related to the start date and time, the terminal device P1 searches for and extracts the face cut-out image associated with information of an image capturing time point from the input date and time to the current date and time among each of the plurality of face cut-out images included in the detection result. In a case where a date and time is input only to the input field related to the end date and time, the terminal device P1 searches for and extracts the face cut-out image associated with information of an image capturing time point from the oldest date and time to the input date and time among each of the plurality of face cut-out images included in the detection result.

A person condition input field FS receives input (upload) operation of a face image of a person desired to be searched by the user. When the face image of the person is input to the person condition input field FS, the terminal device P1 generates a search request (that is, a control signal) for searching for a person similar to or the same as the person corresponding to the face image in the server S1. The terminal device P1 transmits the input face image and the search request to the server S1.

Based on the search request, the server S1 determines whether or not a person similar to or the same as the person corresponding to the face image is reflected, or whether or not there is a face image of the person (the same person determination), and extracts the face image of the person determined to be the similar or the same person. The server S1 generates a similar face image group including the face image of the person extracted as a detection result, and transmits the similar face image group to the terminal device P1.

The terminal device P1 displays a thumbnail image of each of a plurality of face cut-out images included in the similar face image group transmitted from the server S1 in the display field SRR. In the example shown in FIG. 4, the terminal device P1 does not input a face image of a person to the person condition input field FS. A screen example in a case where a face image of a person is input to the person condition input field FS is described in detail in FIG. 8.

In the case where a face image is input to the person condition input field FS, the terminal device P1 displays only thumbnail images of the face cut-out images included in the similar face image group in the display field SRR. Thus, in the case where a face image is input in the person condition input field FS, the terminal device P1 may not display the thumbnail image surrounded by a frame.

In the data selection field CS, names capable of identifying each piece of the recorded video data used to generate a detection result are arranged in a list form. The data selection field CS receives selection operation by the user with respect to display conditions for limiting (selecting) a face cut-out image to be displayed in the display field SRR among each of a plurality of face cut-out images received as a detection result based on information of the recorded video data in which an image of the person corresponding to the face cut-out image is captured.

The terminal device P1 extracts the face cut-out image generated by using the recorded video data selected in the data selection field CS among each of the plurality of face cut-out images included in the detection result, and displays the pair of the thumbnail image of the extracted face cut-out image and the information of the image capturing time point in the display field SRR. A name of the recorded video data arranged in the data selection field CS may be set by user operation when transmitted to the server S1, or may be set to an optional name on the data selection field CS.

In the place selection field PS, information (a station name, a building name, a facility name, a place name, or the like) of a place where an image of a person corresponding to a face cut-out image is captured is arranged in a list form. The place information arranged in the place selection field PS is created by the server S1 by using map data or the like acquired via the network NW1 based on position information (for example, position information shown by latitude or longitude acquired by a global positioning system (GPS)) associated with each of the plurality of face cut-out images included in the detection result. The place selection field PS receives selection operation by the user with respect to display conditions for limiting (selecting) a face cut-out image to be displayed in the display field SRR among each of a plurality of face cut-out images received as a detection result based on position information in which an image of the person corresponding to the face cut-out image is captured.

The terminal device P1 extracts the face cut-out image captured at a place selected in the place selection field PS among each of the plurality of face cut-out images included in the detection result, and displays thumbnail data in which the thumbnail image of the extracted face cut-out image is paired with the information of the image capturing time point in the display field SRR.

The place information arranged in the place selection field PS can be edited by user operation received via the operation unit 14 of the terminal device P1. For example, in a case where the recorded video data file is captured in the same facility or in a case where the recorded video data file is captured at a predetermined place, the user may set more detailed place information based on position information associated with the face cut-out image. Specifically, the user may set place information arranged in the place selection field PS in more detail, such as "entrance", "lobby", "hall", and "underground parking lot" shown in FIG. 10 to be described later.

The place selection field PS may include a starting point position input field PS1. The starting point position input field PS1 receives input of a starting point position by the user. When the starting point position is input to the starting point position input field PS1, the terminal device P1 calculates a distance between the starting point position and each place shown in a list form in the place selection field PS. Based on the calculated distance, the terminal device P1 displays each of the plurality of pieces of thumbnail data in each place in the display field SRR by rearranging in an order of being close to the starting point position and in a time series. Places ("Tokyo Station", "Shinagawa Station", "Yokohama Station", "Kamakura Station", or the like in an example of FIG. 9) shown in the place selection field PS may be input to the starting point position input field PS1, and other places, facility names, land names, latitude and longitude information, or the like may be input to the starting point position input field PS1.

The execution button Bt is a button for executing a display depending on each display condition input to the input field SCC or a search depending on search conditions. When the execution button Bt is selected (pressed) by user operation, the terminal device P1 executes processing based on each display condition input to the input field SCC or search conditions.

A scroll bar SB is a widget for browsing each of a plurality of pieces of thumbnail data arranged in a time series and displayed in the display field SRR. The scroll bar SB displays each piece of the thumbnail data having information of different image capturing time in the display field SRR based on operation of a knob SL in a horizontal direction by the user operation. In a case where the number of pieces of recorded video data in the data selection field CS is large or in a case where the number of pieces of information in the place selection field PS is large, the scroll bar SB may be generated also in a longitudinal direction.

In the example shown in FIG. 4, the input field SCC receives input operation by the user in the date and time input field DT and the data selection field CS. When the execution button Bt is selected (pressed) by the user operation, the terminal device P1 extracts each of the face cut-out images associated with information of image capturing time points after 13:09 on Jan. 5, 2019 from a detection result based on "2019/01/05 13:09:00" input to the input field related to the start date and time in the date and time input field DT.

Further, the terminal device P1 extracts each of the face cut-out images generated by using the "recorded video data 1" and the "recorded video data 2" from the extracted face cut-out images based on the "recorded video data 1" and the "recorded video data 2" selected in the data selection field CS. The terminal device P1 rearranges each of the plurality of pieces of thumbnail data Sm11 to Sm17 in which the thumbnail image of each of the plurality of extracted face cut-out images is paired with the information of the image capturing time point for each piece of recorded video data and in a time series, and displays each of the plurality of pieces of thumbnail data Sm11 to Sm14 included in the similar face image group surrounded with a frame Mk1 in the display field SRR. In the example of FIG. 4, the display field SRR rearranges and displays each of the plurality of pieces of thumbnail data Sm11 to Sm17 for each piece of recorded video data in a time series of "2019/01/05 13:09:00", "2019/01/05 13:10:00", and "2019/01/05 13:11:00".

In addition, in a case where there are a plurality of pieces of thumbnail data including information of image capturing time points in the same time period of time in respective detection results of a plurality of pieces of data selected in the data selection field CS, the terminal device P1 rearranges the pieces of thumbnail data in a time series from the earliest image capturing time point in the same period of time, and rearranges and displays the pieces of thumbnail data so that they are not arranged adjacent to each other in a longitudinal direction of a paper surface. In a case where there are a plurality of pieces of thumbnail data including information of the same image capturing time point, the pieces of thumbnail data may be displayed side by side adjacent to each other in the longitudinal direction of the paper surface. Accordingly, even in a case where a person is detected a plurality of times in the same period of time, the user can intuitively grasp relation of the respective image capturing time points of the pieces of thumbnail data as the detection results detected a plurality of times.

Specifically, in the example shown in FIG. 4, the user can intuitively grasp that each of the thumbnail data Sm11, Sm12, and Sm15 as detection results detected in the same period of time from an image capturing time point "13:09:00" to an image capturing time point "13:10:00" of each of the plurality of pieces of data "recorded video data 1" and "recorded video data 2" selected in the data selection field CS is detected in an order of the thumbnail data Sm11, the thumbnail data Sm15, and the thumbnail data Sm12.

As described above, the face detection system 100 according to the embodiment can display the thumbnail image of each of the plurality of generated face cut-out images detected by using one or more recorded video data files and the information of the image capturing time point side by side. Accordingly, the user can shorten time required to confirm an image capturing time point of each thumbnail image (face cut-out image), and can more efficiently accomplish a monitoring service or an investigation service.

Figure 5:
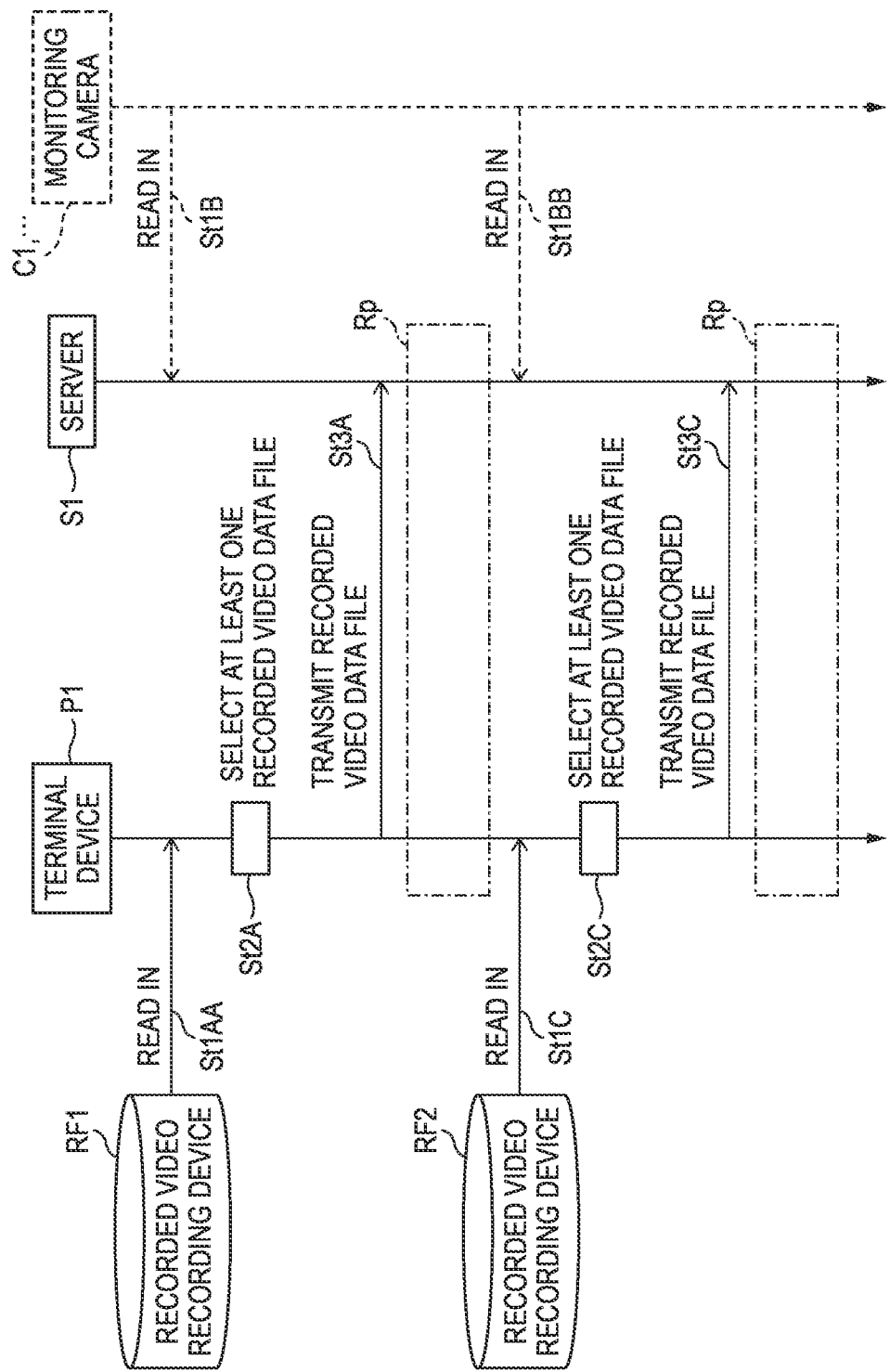
FIG. 5 is a sequence diagram showing an example of a procedure for reading in a plurality of recorded video data of the face detection system according to the embodiment.
Figure 6:
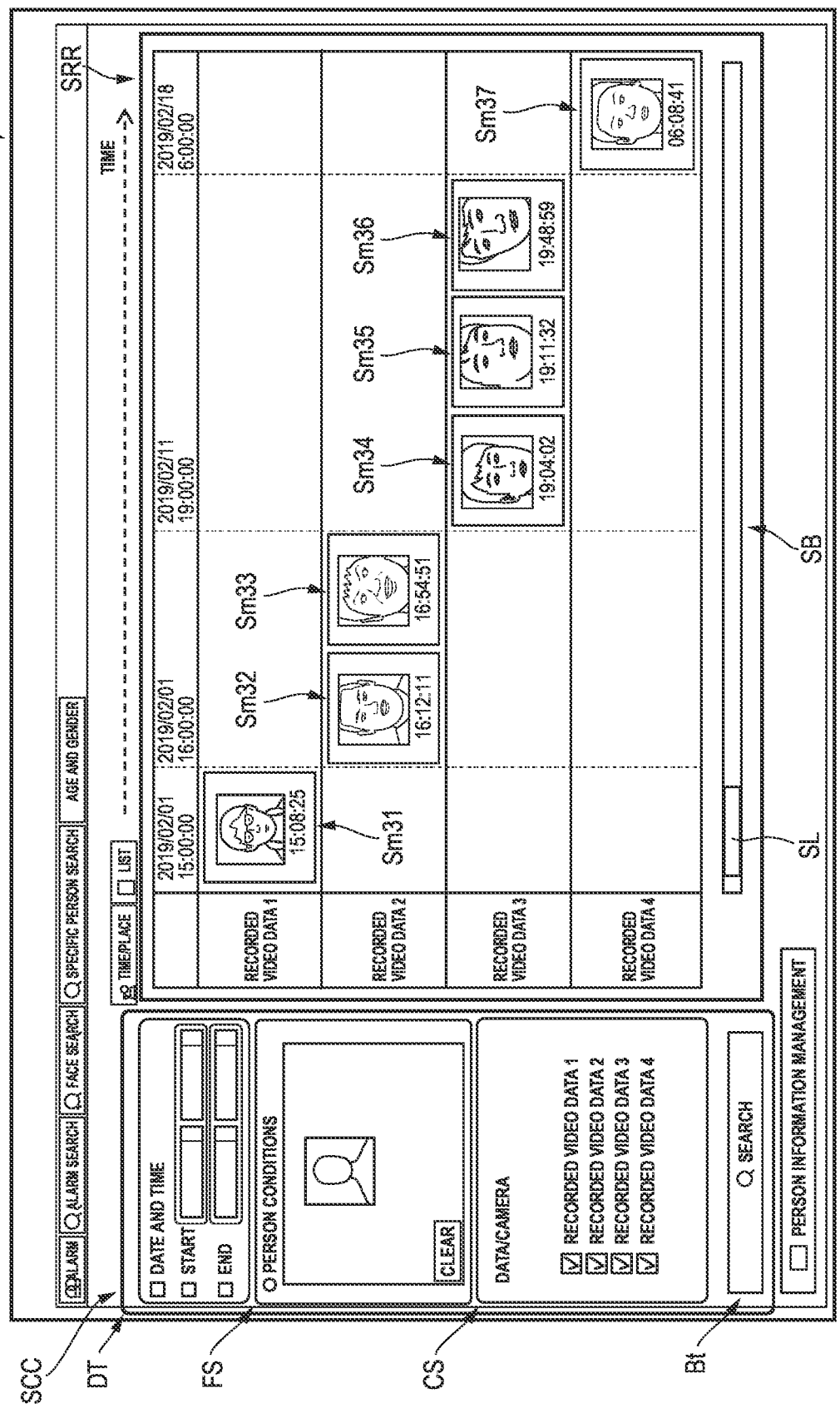
FIG. 6 is an example of a screen showing detection results based on a plurality of pieces of recorded video data whose image capturing time points are different for a predetermined time or more.

Next, an example of a screen Mn2 showing detection results using a plurality of recorded video data files captured at different image capturing time points for a predetermined time or more is described with reference to FIG. 5 and FIG. 6. FIG. 5 is a sequence diagram showing an example of a procedure for reading in a plurality of recorded video data of the face detection system 100 according to the embodiment. FIG. 6 is an example of the screen Mn2 showing detection results based on a plurality of pieces of recorded video data whose image capturing time points are different for a predetermined time or more. The predetermined time referred to here is, for example, five days or more, one week or more, or ten days or more.

First, processing executed by the terminal device P1 and the server S1 in examples shown in FIG. 5 and FIG. 6 is described. In the example shown in FIG. 5, the number of times the recorded video data file is read in and transmitted to the server S1 is two, but the number of times is not limited, and may be, for example, three, four, or seven.

The terminal device P1 reads in one or more recorded video data files from a recorded video recording device RF1 (St1AA). As a recorded video data file to be read in, only the recorded video data file selected (designated) by the user operation may be read in.

The server S1 reads in data of one or more live videos from each of the plurality of monitoring cameras C1, . . . communicably connected to each other (SUB).

The terminal device P1 receives selection operation by the user on the recorded video data file desired to be transmitted to the server S1 and subjected to face detection among the read-in recorded video data files (St2A). The terminal device P1 transmits one or more recorded video data files selected (designated) by the user to the server S1 via the network NW1 (St3A).

After the processing of step St3A, the face detection system 100 executes the same processing as step St4 to step St17 illustrated in FIG. 3A and FIG. 3B, and displays a detection result or an alert notification screen on the monitor 13.

The terminal device P1 reads in one or more recorded video data files from a recorded video recording device RF2 (St1C). The recorded video recording device RF2 may be the same recorded video recording device as the recorded video recording device RF1.

The server S1 reads in data of one or more live videos from each of the plurality of monitoring cameras C1, . . . communicably connected to each other (St1BB).

The terminal device P1 receives selection operation by the user on the recorded video data file desired to be transmitted to the server S1 and subjected to face detection among the read-in recorded video data files (St2C). The terminal device P1 transmits one or more recorded video data files selected (designated) by the user to the server S1 via the network NW1 (St3C).

After the processing of step St3C, the face detection system 100 executes the same processing as step St4 to step St17 illustrated in FIG. 3A and FIG. 3B, and displays a detection result (search result) or an alert notification screen on the monitor 13. The detection result (search result) generated after the processing of step St3C includes a detection result (search result) generated by using the recorded video data file read in from the recorded video recording device RF1 and a detection result (search result) generated by using the recorded video data file read in from the recorded video recording device RF2.

The terminal device P1 displays, on the monitor 13, the screen Mn2 showing the detection result (search result) generated by using the recorded video data file read in from each of the plurality of recorded video recording devices RF1 and RF2.

In the example shown in FIG. 6, each of the "recorded video data 1" and the "recorded video data 2" is a recorded video data file recorded in the recorded video recording device RF1. Each of "recorded video data 3" and "recorded video data 4" is a recorded video data file which is recorded in the recorded video recording device RF2 and obtained by capturing an image at an image capturing time point ten days or more after the latest image capturing time point (that is, image capturing time point at the end of videotaping) recorded in each of the "recorded video data 1" and the "recorded video data 2".

The input field SCC receives selection of each of the "recorded video data 1", "recorded video data 2", "recorded video data 3", and "recorded video data 4" in the data selection field CS. The terminal device P1 generates each piece of thumbnail data Sm31, Sm32, Sm33, Sm34, Sm35, Sm36, and Sm37 of each of the face cut-out images based on display conditions for displaying a detection result of a person reflected on each of the "recorded video data 1", the "recorded video data 2", the "recorded video data 3", and the "recorded video data 4", and displays each piece of thumbnail data Sm31, Sm32, Sm33, Sm34, Sm35, Sm36, and Sm37 in the display field SRR side by side in a time series for each piece of recorded video data.

From the above, the face detection system 100 can generate a detection result and an alert notification screen based on the plurality of pieces of recorded video data whose image capturing time points are different by a predetermined time (for example, 10 days) or more. Accordingly, even in a case where a user detects a person from the recorded video data files whose image capturing time points are different or searches for a predetermined person, for example, in a monitoring service or an investigation service for a person, the user can generate a detection result (search result) or an alert notification screen by using each piece of the recorded video data having different image capturing time points for a predetermined time or more, and thus can more efficiently accomplish the monitoring service or the investigation service.

Figure 7:
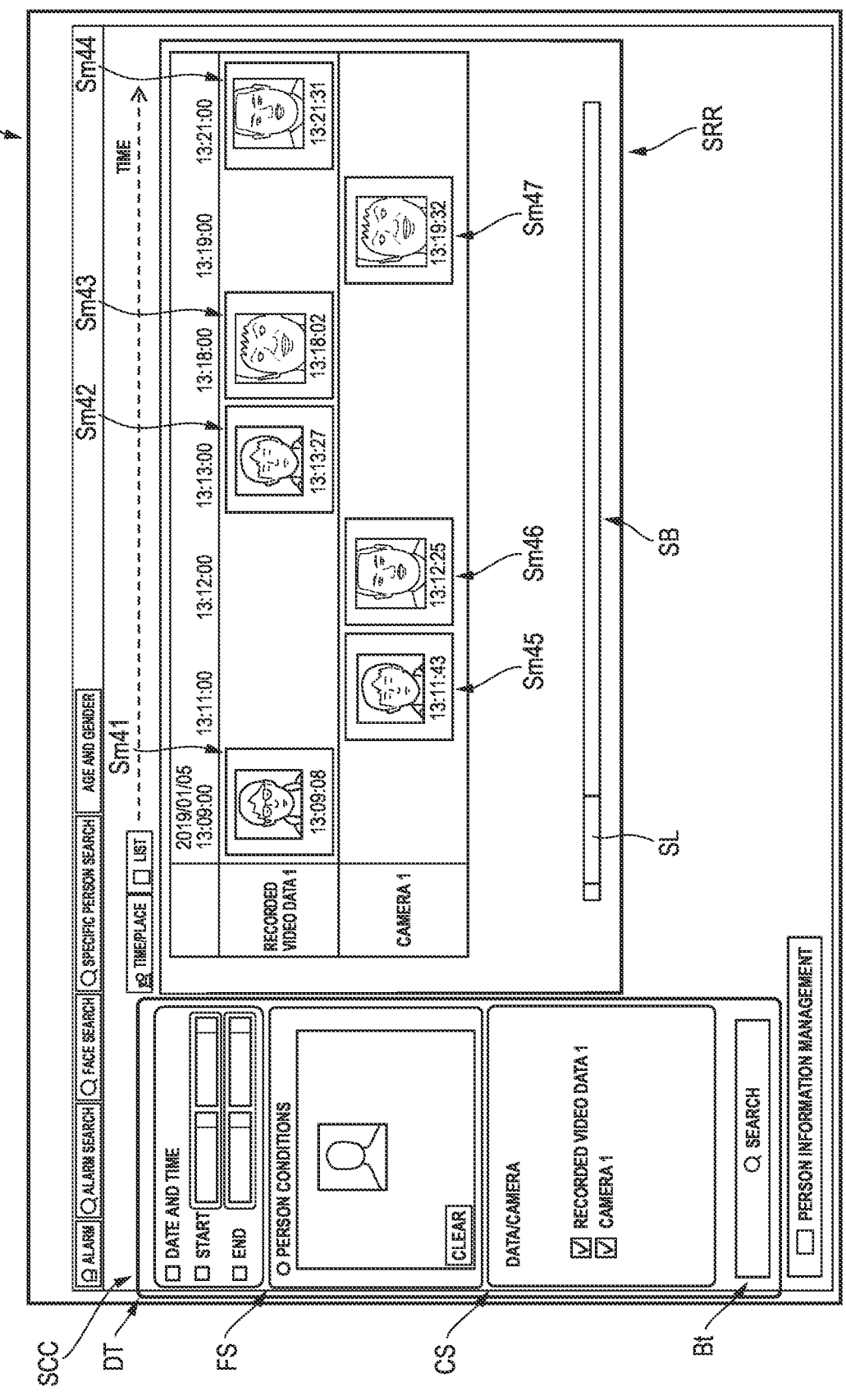
FIG. 7 is an example of a screen showing a detection result based on a recorded video data file and data of a live video.

An example of a screen Mn3 showing a detection result generated by using a recorded video data file recorded in the recorded video recording device RF and live video data captured by a monitoring camera is described with reference to FIG. 7. FIG. 7 is an example of the screen Mn3 showing a detection result based on the recorded video data file and the live video data.

In the example shown in FIG. 7, the server S1 detects a person in the video by using at least one recorded video data file transmitted from the terminal device P1 and the live video data transmitted from the communicably connected monitoring camera C1. The input field SCC receives selection of each of the "recorded video data 1" and a "camera 1" in the data selection field CS.

The terminal device P1 generates each piece of thumbnail data Sm41, Sm42, Sm43, Sm44, Sm45, Sm46, and Sm47 corresponding to each of a plurality of face cut-out images based on display conditions for displaying a detection result of a person reflected on each of the "recorded video data 1" and the "camera 1", and displays each piece of thumbnail data Sm41, Sm42, Sm43, Sm44, Sm45, Sm46, and Sm47 side by side in a time series for each piece of recorded video data and in the display field SRR.

Accordingly, the face detection system 100 according to the embodiment can execute detection processing simultaneously by using the recorded video data file and the live video data, and can comparably display the detection result detected from each of the recorded video data file and the live video data on the same screen Mn3.

In FIG. 7, an example is shown in which each of the "recorded video data 1" and the "camera 1" is data obtained by capturing an image at the image capturing time point in the same period of time ("2019/01/05 13:09:00" to "13:21:00"), but may be, for example, data obtained by capturing images in different periods of time for a predetermined time or more as described in FIG. 5 and FIG. 6.

Figure 8:
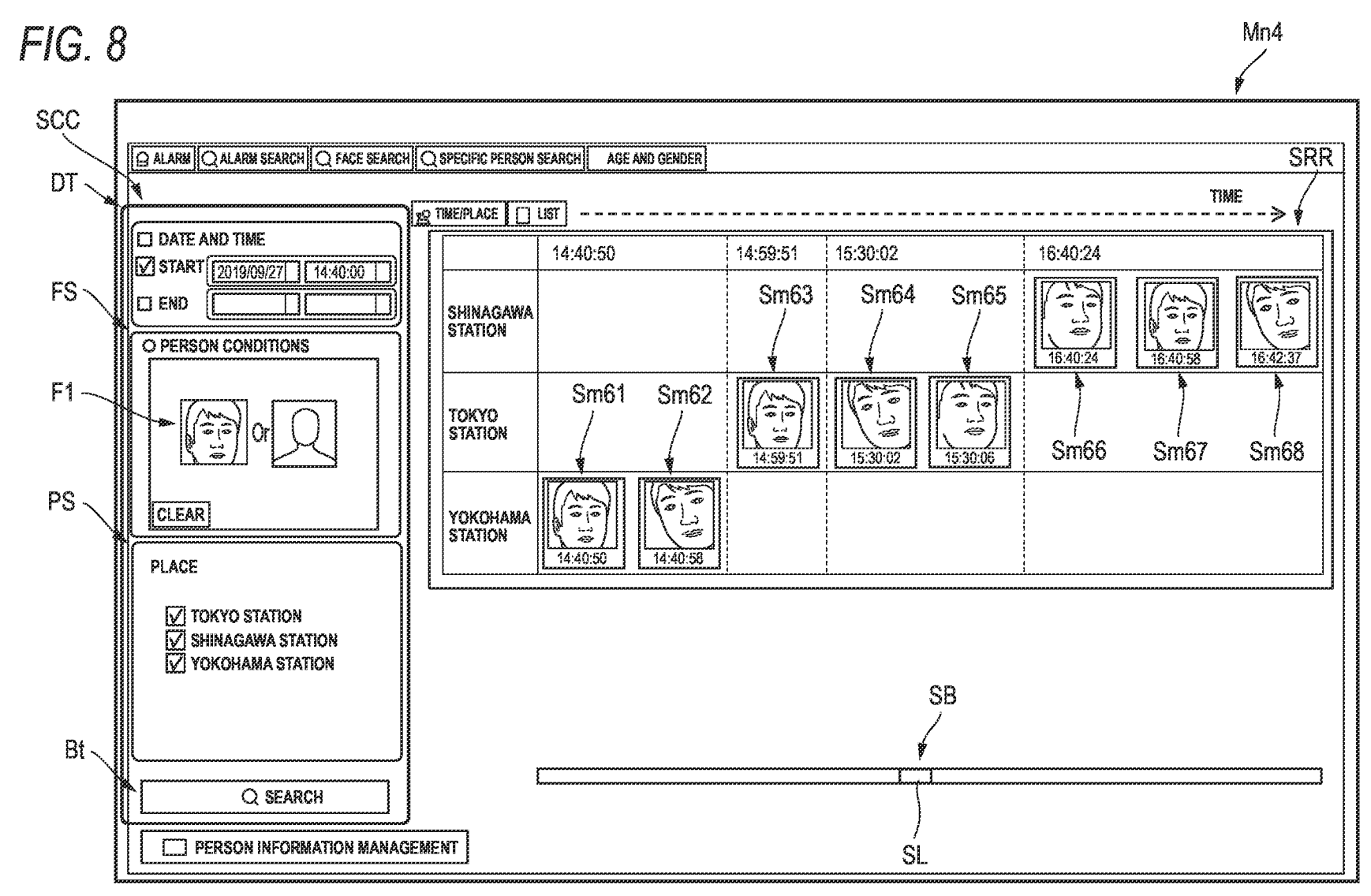

With reference to FIG. 8, an example of a screen Mn4 showing a search result obtained by searching for a person similar to or the same as a person of a face image for search F1 input to the person condition input field FS in each place where an image of the person is captured is described. FIG. 8 is an example of the screen Mn4 showing a search result based on the face image for search F1 input by a user.

In the example shown in FIG. 8, the terminal device P1 receives input operation of the face image for search F1 by the user in the person condition input field FS in the input field SCC. The terminal device P1 generates a search request (control signal) based on the input face image for search F1, and transmits the search request and the face image for search F1 to the server S1.

Based on the search request and the face image for search F1 transmitted from the terminal device P1, the server S1 executes determination (same person determination) of whether or not there is a person similar or the same as the person corresponding to the face image for search F1 from the recorded video data. The server S1 generates a similar face image group including face cut-out images determined to be the similar or same person as a result of the same person determination, and transmits the similar face image group generated as a search result based on the face image for search F1 to the terminal device P1.

The input field SCC receives the input of the face image for search F1 in the person condition input field FS, receives input of "2019/09/27 14:40:00" in an input field related to a start date and time in the date and time input field DT, and receives selection of "Tokyo Station", "Shinagawa Station", and "Yokohama Station" in the place selection field PS.

Based on the display conditions input to the input field SCC, the terminal device P1 generates each piece of thumbnail data Sm61, Sm62, Sm63, Sm64, Sm65, Sm66, Sm67, and Sm68 corresponding to each of the plurality of face cut-out images included in the search result (similar face image group) transmitted from the server S1. Based on the position information associated with each of the plurality of face cut-out images, the terminal device P1 rearranges each of the plurality of pieces of thumbnail data Sm61 to Sm68 in a time series and for each of "Tokyo Station", "Shinagawa Station", and "Yokohama Station" selected in the place selection field PS, and displays each piece of thumbnail data Sm61 to Sm68 in the display field SRR.

The terminal device P1 has display conditions for displaying each of the face cut-out images determined to be similar to or the same as that in the face image for search F1 in the example shown in FIG. 8, and thus, each of the plurality of pieces of thumbnail data Sm61 to Sm68 is not surrounded by a frame, but may be surrounded by a frame and displayed.

From the above, the face detection system 100 according to the embodiment can search for a person similar to or the same as the person in the face image input by the user by using one or more recorded video data files. In addition, since the face detection system 100 can rearrange and display the thumbnail data based on the position information and the image capturing time point information associated with the face cut-out image, it is possible to more efficiently accomplish the monitoring service or the investigation service by the user.

Accordingly, the user can confirm the position information (place) and the image capturing time point information in which an image of a person is captured which are indicated by each piece of the thumbnail data displayed as the search result, and can know a gait, a movement route, a time point, or the like of the person similar to or the same as that in the face image for search F1. For example, in the example shown in FIG. 8, the user can know that the person considered to be the same person as that in the face image for search F1 is at a time point "14:40:50" and in the place "Yokohama station". The user knows that the person moves to the place "Tokyo Station", stays from a time point "14:49:51" to a time point "15:30:02", and then moves to the place "Shinagawa Station" at a time point "16:40:24".

Figure 9:
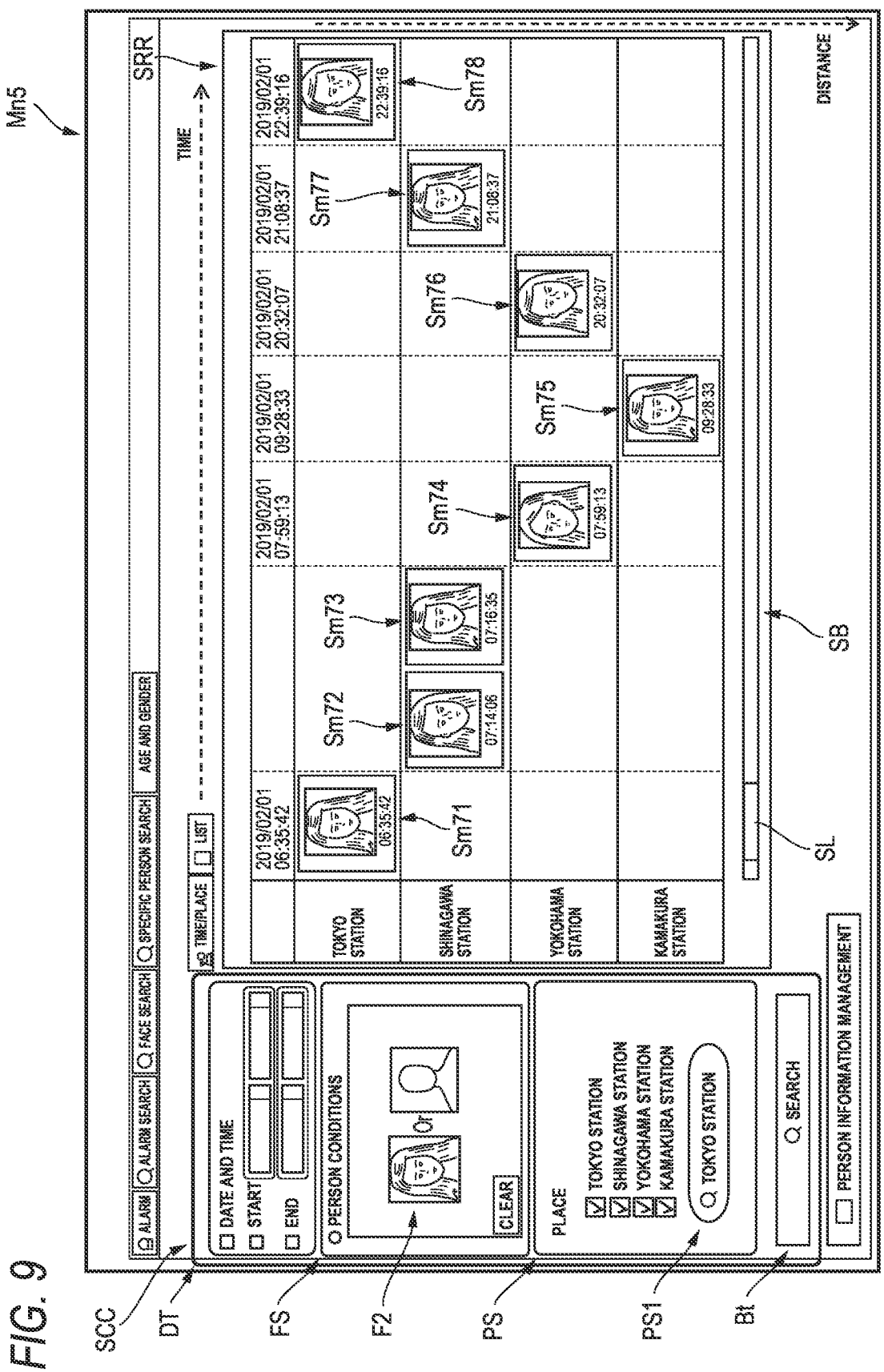
FIG. 9 is an example of a screen showing a search result based on a starting point position designated by a user.

With reference to FIG. 9, an example of a screen Mn5 is described in which search results obtained by searching for a person corresponding to a face image for search F2 input to the person condition input field FS are rearranged based on a distance from a starting point position "Tokyo Station" designated by a user. FIG. 9 is an example of the screen Mn5 showing the search results based on the starting point position designated by the user.

In the example shown in FIG. 9, the terminal device P1 receives input operation of the face image for search F2 by the user in the person condition input field FS in the input field SCC. The terminal device P1 generates a search request (control signal) based on the input face image for search F2, and transmits the search request and the face image for search F2 to the server S1.

Based on the search request and the face image for search F2 transmitted from the terminal device P1, the server S1 executes determination (same person determination) of whether or not there is a person similar or the same as the person corresponding to the face image for search F2 from the recorded video data. The server S1 generates a similar face image group including face cut-out images determined to be the similar or same person as a result of the same person determination, and transmits the similar face image group generated as a search result based on the face image for search F2 to the terminal device P1.

The input field SCC receives the input of the face image for search F2 in the person condition input field FS, and receives selection of "Tokyo Station", "Shinagawa Station", "Yokohama Station", and "Kamakura Station" in the place selection field PS and input of "Tokyo Station" in the starting point position input field PS1.

Based on the display conditions input to the input field SCC, the terminal device P1 generates each piece of thumbnail data Sm71, Sm72, Sm73, Sm74, Sm75, Sm76, Sm77, and Sm78 corresponding to each of the plurality of face cut-out images included in the search result (similar face image group) transmitted from the server S1. The terminal device P1 calculates each of distances between the starting point position "Tokyo Station" input to the starting point position input field PS1 and "Tokyo Station", "Shinagawa Station", "Yokohama Station", and "Kamakura Station" selected in the place selection field PS based on the position information associated with each of the plurality of face cut-out images.

Based on the calculated distance, the terminal device P1 rearranges each of "Tokyo station", "Shinagawa station", "Yokohama station", and "Kamakura station" selected in the place selection field PS to "Tokyo station", "Shinagawa station", "Yokohama station", "Kamakura station" in an order close to the starting point position "Tokyo station". The terminal device P1 rearranges each of the plurality of pieces of thumbnail data Sm71 to Sm78 in which an image is captured at each place of "Tokyo Station", "Shinagawa Station", "Yokohama Station", and "Kamakura station" in a time series and displays each piece of thumbnail data Sm71 to Sm78 in the display field SRR. The terminal device P1 has display conditions for displaying each of the face cut-out images determined to be similar to or the same as that in the face image for search F2 in the example shown in FIG. 9, and thus, each of the plurality of pieces of thumbnail data Sm71 to Sm78 is not surrounded by a frame, but may be surrounded by a frame and displayed.

From the above, the face detection system 100 according to the embodiment can rearrange and display thumbnail data based on the detection result or the search result detected from one or more recorded video data files depending on a distance from the starting point position designated by the user. In addition, since the face detection system 100 can rearrange and display the thumbnail data based on the position information and the image capturing time point information associated with the face cut-out image, it is possible to more efficiently accomplish the monitoring service or the investigation service by the user.

It is needless to say that the rearrangement depending on the distance from the starting point position designated by the user is not limited to a search result related to a specific person, and may be applied to display of thumbnail data of all persons included in the detection result detected from only one or more recorded video data files.

Accordingly, the user can confirm the position information (place) and the image capturing time point information in which an image of a person is captured which are indicated by each piece of the thumbnail data displayed as the search result. In addition, the user can intuitively grasp a gait, a movement route, a time point, or the like of the person similar to or the same as that in the face image for search F2 by rearranging and displaying each piece of the thumbnail data in each place based on the distance from the designated starting point position. For example, in the example shown in FIG. 9, the user can intuitively grasp that a person considered to be the same person as that in the face image for search F2 moves in a direction away from the starting point position "Tokyo Station" in a period of time in the morning, and the person returns to the starting point position "Tokyo Station" in a period of time in the evening.

Figure 10:
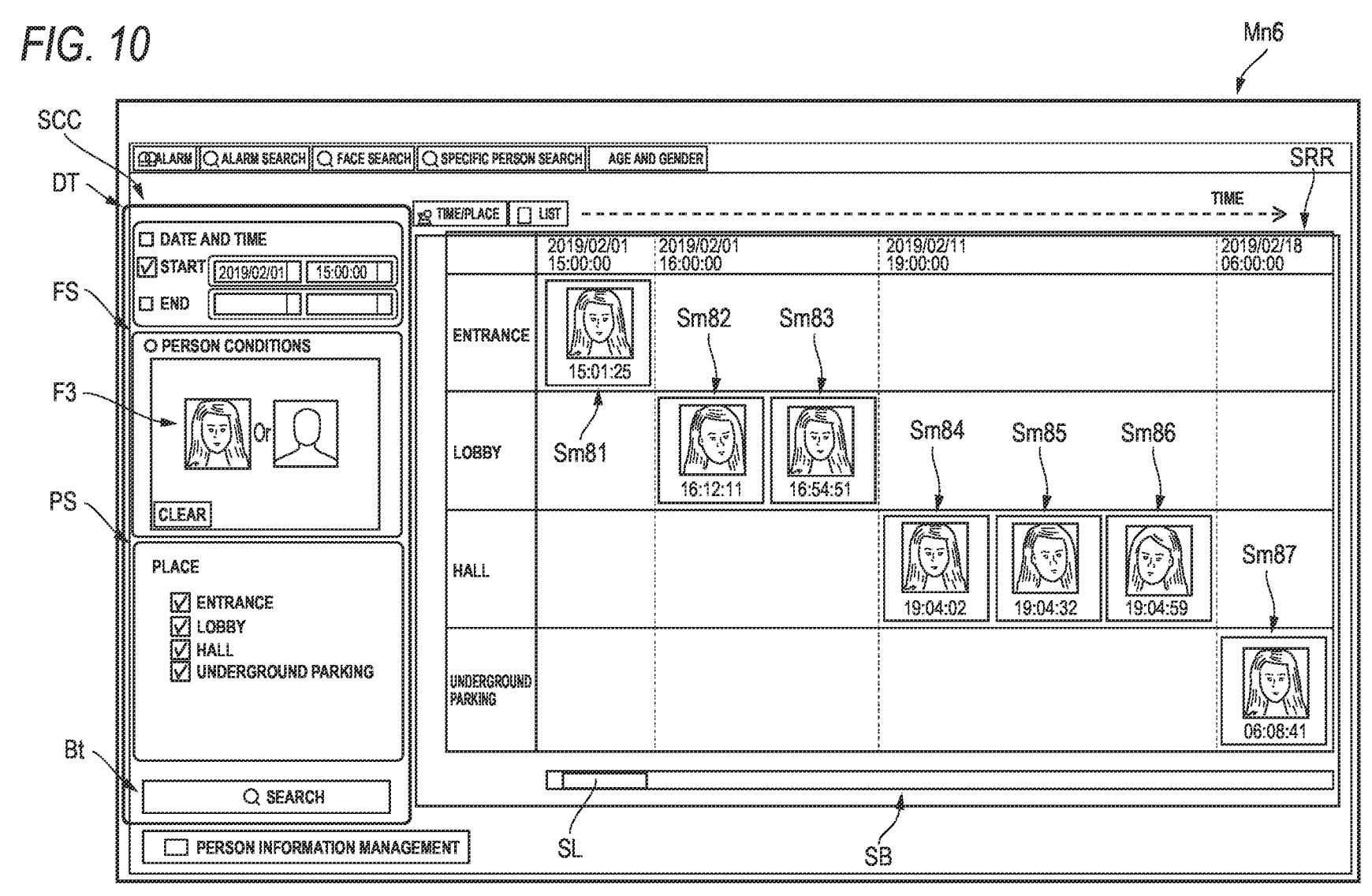

With reference to FIG. 10, an example of a screen Mn6 which displays, in a merged manner, search results obtained by searching for a person similar to or the same as a person of a face image for search F3 input to the person condition input field FS is described. FIG. 10 is an example of the screen Mn6 which displays search results in a merged manner.

In the example shown in FIG. 10, the terminal device P1 receives input operation of the face image for search F3 by the user in the person condition input field FS in the input field SCC. The terminal device P1 generates a search request (control signal) based on the input face image for search F3, and transmits the search request and the face image for search F3 to the server S1.

Based on the search request and the face image for search F3 transmitted from the terminal device P1, the server S1 executes determination (same person determination) of whether or not there is a person similar or the same as the person corresponding to the face image for search F3 from the recorded video data. The server S1 generates a similar face image group including face cut-out images determined to be the similar or same person as a result of the same person determination. Further, the server S1 executes determination (stay determination) of whether or not an image of each of the plurality of face cut-out images included in the generated similar face image group is continuously captured for a predetermined time or more at the same place based on position information associated with each of the plurality of face cut-out images. As a result of the stay determination, the server S1 generates a staying face image group including a plurality of face cut-out images determined to be continuously captured for a predetermined time or more at the same place among the plurality of face cut-out images included in the similar face image group.

The same place referred to here indicates a place displayed in a list form in the place selection field PS. In addition, the predetermined time referred to here is a time (5 minutes, 10 minutes, 30 minutes, or the like) optionally set by the user operation, and FIG. 10 shows an example in which images are continuously captured for 30 minutes or more.

The server S1 generates a search result including the generated similar face image group and staying face image group, and transmits the search result to the terminal device P1.

The input field SCC receives the input of the face image for search F3 in the person condition input field FS, receives input of "2019/02/01 15:00:00" in an input field related to a start date and time in the date and time input field DT, and receives selection of the "entrance", "lobby", "hall", and "underground parking lot" in the place selection field PS. In a case where it is desired to set a place that cannot be acquired from map data, such as each place shown in a list format in the place selection field PS shown in FIG. 10, a name of the place may be optionally set (edited) by the user operation.

Based on the display conditions input to the input field SCC, the terminal device P1 generates each piece of thumbnail data Sm81, Sm82, Sm83, Sm84, Sm85, Sm86, and Sm87 corresponding to each of the plurality of face cut-out images included in the search result (similar face image group and staying face image group) transmitted from the server S1. Each of the plurality of face cut-out images included in the similar face image group corresponds to each of the plurality of pieces of thumbnail data Sm81 to Sm87.

Based on the position information associated with each of the plurality of face cut-out images, the terminal device P1 rearranges each piece of thumbnail data Sm81 to Sm87 of the face cut-out image captured at each place of the "entrance", "lobby", "hall", and "underground parking lot" selected in the place selection field PS in a time series, and displays each piece of thumbnail data Sm81 to Sm87 in the display field SRR. The terminal device P1 has display conditions for displaying each of the face cut-out images determined to be similar to or the same as that in the face image for search F3 in the example shown in FIG. 10, and thus, each of the plurality of pieces of thumbnail data Sm81 to Sm87 is not surrounded by a frame, but may be surrounded by a frame and displayed.

In the display field SRR, each of the plurality of pieces of thumbnail data Sm81 to Sm87 included in the similar face image group as the search result is displayed side by side in each place where an image is captured and in a time series. On the other hand, each of the plurality of face cut-out images included in the staying face image group is each of the plurality of pieces of thumbnail data Sm82 and Sm83, and is displayed in a merged manner in the example shown in FIG. 10.

The merged display referred to here indicates that a face cut-out image captured first during a predetermined time and a face cut-out image captured last during a predetermined time are extracted from each of the face cut-out images of a person included in the staying face image group captured continuously for a predetermined time or more, and each piece of thumbnail data (the thumbnail data Sm82 and Sm83 in the example of FIG. 10) of the two face cut-out images is displayed side by side. Each of the plurality of face cut-out images included in the staying face image group may be a face image detected from different pieces of recorded video data and generated.

The merged display is enabled or disabled by user operation. Specifically, when any one of the plurality of pieces of thumbnail data is selected, the terminal device P1 enables the merged display and displays only two pieces of thumbnail data, and when any one of the two pieces of thumbnail data is selected again in a state of being displayed in a merged manner, the terminal device P1 disables and cancels the merged display, and displays the plurality of pieces of thumbnail data again.

Accordingly, the user can confirm more thumbnail data whose image is captured in different periods of time in the display field SRR.

Figure 11:
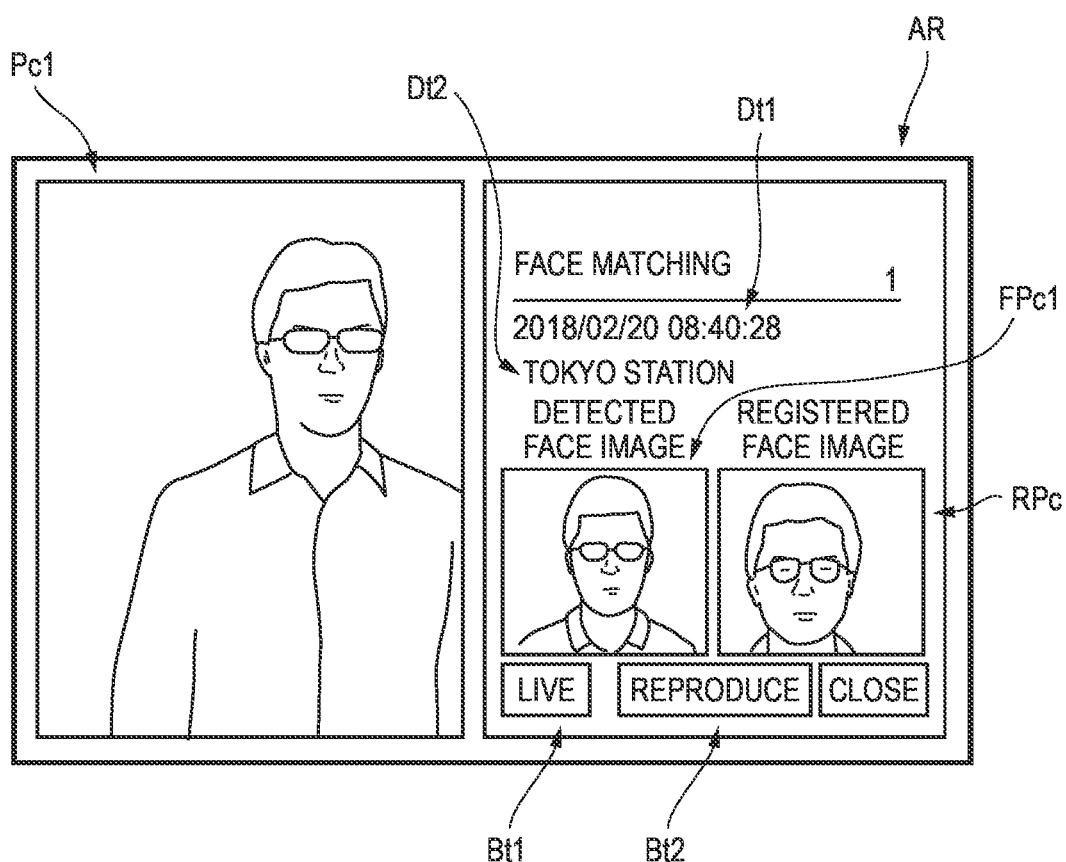
FIG. 11 is an example of an alert notification screen.

An example of the alert notification screen AR generated in a case where a person similar to or the same as a target shown by a registered face image registered in the blacklist database DB is detected by the server S1, and displayed on the monitor 13 is described with reference to FIG. 11. FIG. 11 is an example of the alert notification screen AR.

In the collation determination processing in step St14 shown in FIG. 3A, in a case where it is determined that there is a face cut-out image to be collated with the registered face image of the target among each of the plurality of face cut-out images, the server S1 generates the alert notification screen AR including the face cut-out image collated with the registered face image of the target. The server S1 transmits the generated alert notification screen AR to the terminal device P1. The alert notification screen AR is displayed on the monitor 13 of the terminal device P1.

The alert notification screen AR displayed on the monitor 13 of the terminal device P1 is generated by including a captured image Pc1 in which a target is detected in recorded video data, a face cut-out image (detected face image) FPc1 obtained by cutting out a face region of the target from the captured image, a registered face image RPc registered in the blacklist database DB, information Dt1 of an image capturing time point at which the captured image Pc1 is captured, information Dt2 of a place where the captured image Pc1 is captured, and a reproduction button Bt2. The captured image Pc1 may be omitted.

The captured image Pc1 may be the same face cut-out image as the face cut-out image FPc1, an upper body image obtained by cutting out an upper body region of the target, or a whole body image obtained by cutting out a whole body region of the target.

When the reproduction button Bt2 is selected (pressed) by user operation, the terminal device P1 reproduces recorded video data in a period of time in which the target is detected among the recorded video data. The recorded video data in the period of time in which the target is detected is transmitted together with the alert notification screen AR to the terminal device P1 by the server S1.

In addition, the alert notification screen AR may be generated by including a live button Bt1 in a case where the recorded video data used to detect the target is live video data.

When the live button Bt1 is selected (pressed) by user operation, a distribution request (control signal) of a live video of a monitoring camera which captures the live video data in which the target is detected is generated and transmitted to the server S1. The server S1 transmits the live video data transmitted from the corresponding monitoring camera to the terminal device P1 based on the distribution request of the live video transmitted from the terminal device P1. The terminal device P1 displays the live video transmitted from the server S1 on the monitor 13.

From the above, in a case where the face detection system 100 determines that there is a face cut-out image to be collated with the registered face image of the target among the plurality of face cut-out images detected from one or more recorded video data files, the face detection system 100 can notify the user that the face image of the person to be collated with the registered face image of the target has been detected.

Accordingly, the user can search for a target from each of the plurality of face cut-out images detected from one or more recorded video data files without executing search due to input of a face image by registering a face image in the blacklist database DB in advance, and thus a monitoring service or an investigation service can be accomplished more efficiently.

From the above, in the face detection system 100 according to the embodiment, the terminal device P1 capable of acquiring at least one recorded video data file and the server S1 are communicably connected. The terminal device P1 acquires the recorded video data file selected by user operation and transmits the recorded video data file to the server S1. The server S1 converts the received recorded video data file into recorded video data having a predetermined format, detects a face of one or more persons based on the converted recorded video data, associates information of an image capturing time point at which an image of a person corresponding to the face cut-out image is captured with one or more face cut-out images obtained by cutting out a region of the detected face, and transmits the information to the terminal device P1. The terminal device P1 displays a thumbnail image of the received face cut-out image and the image capturing time point information side by side in a time series on the monitor 13.

Accordingly, the face detection system 100 according to the embodiment can display the thumbnail image of each of the plurality of generated face cut-out images detected by using one or more recorded video data files and the information of the image capturing time point side by side. Therefore, the user can shorten time required to confirm an image capturing time point of each thumbnail image (face cut-out image), and can more efficiently accomplish a monitoring service or an investigation service.

The recorded video data file used in the face detection system 100 according to the embodiment is video data captured at different image capturing time points for a predetermined time or more. Accordingly, the face detection system 100 according to the embodiment can generate a detection result based on the plurality of pieces of recorded video data whose image capturing time points are different by a predetermined time (for example, 10 days) or more. Therefore, even in a case where a user detects a person from the recorded video data files whose image capturing time points are different or searches for a predetermined person, for example, in a monitoring service or an investigation service for a person, the user can confirm a detection result (search result) using each piece of the recorded video data having different image capturing time points for a predetermined time or more, and thus can more efficiently accomplish the monitoring service or the investigation service.

The recorded video data file used in the face detection system 100 according to the embodiment is captured and recorded by a camera provided on a moving object. Accordingly, the face detection system 100 according to the embodiment can generate a detection result obtained by detecting a person in a video by using a recorded video data file in which position information changes. Therefore, even if the recorded video data file to be used is not a monitoring camera but a recorded video data file provided from a general citizen, a private company, or the like, the user can confirm the detection result (search result) using each piece of the recorded video data, so that the monitoring service or the investigation service can be accomplished more efficiently.

The server S1 in the face detection system 100 according to the embodiment extracts a plurality of face cut-out images determined to be the same or similar person from each of one or more face cut-out images, generates a similar face image group including each of the plurality of extracted face cut-out images, and transmits the similar face image group to the terminal device P1. The terminal device P1 includes a thumbnail image of the one or more face cut-out images included in the received similar face image group and corresponding image capturing time point information surrounded with a frame (for example, a frame Mk1 shown in FIG. 4) and displays the thumbnail image and the information on the monitor 13. Accordingly, the face detection system 100 according to the embodiment can visualize, to the user, each of face cut-out images of a person determined to be the similar or the same person among the plurality of face cut-out images. Therefore, the user can intuitively grasp that respective persons in the plurality of thumbnail images surrounded by frames shown in the same line type and line color among the plurality of thumbnail images are the same person, so that the monitoring service or the investigation service can be accomplished more efficiently.

The server S1 in the face detection system 100 according to the embodiment determines whether or not each of the plurality of extracted face cut-out images is continuously captured for a predetermined time or more at the same place, and in a case where the server S1 determines that each of the plurality of extracted face cut-out images is continuously captured for the predetermined time or more at the same place, the server S1 generates a staying face image group including each of the plurality of face images captured during the predetermined time in the similar face image group and transmits the staying face image group to the terminal device P1. The terminal device P1 displays, in a merged manner, the face cut-out image captured first and the face cut-out image captured last during a predetermined time in the received staying face image group side by side on the monitor 13. Accordingly, the face detection system 100 according to the embodiment can display more thumbnail data by the display field SRR. That is, the user can confirm more thumbnail data without operating the scroll bar SB.

The server S1 in the face detection system 100 according to the embodiment receives live video captured by the monitoring camera C1 (an example of a camera), converts the received live video and each of one or more recorded video files into recorded video data having a predetermined format, and detects a face of one or more persons from the plurality of pieces of converted recorded video data. Accordingly, the face detection system 100 according to the embodiment can execute detection processing simultaneously by using the recorded video data file and the live video data, and can comparably display the detection result detected from each of the recorded video data file and the live video data on the same screen.

The terminal device P1 in the face detection system 100 according to the embodiment transmits a face image for search including a face region of a person designated by user operation to the server S1. Based on the received face image for search, the server S1 extracts a face cut-out image of a person the same as or similar to the person in the face image for search from each of one or more face cut-out images and transmits the face cut-out image to the terminal device P1. Accordingly, the face detection system 100 according to the embodiment can search for a person similar to or the same as the person in the face image for search input by the user by using one or more recorded video data files. The user can easily search for a person desired to be searched by the monitoring service or the investigation service by inputting the face image for search, and can easily grasp an image capturing time point at which an image of the person in the face image for search is captured based on the search result displayed on the monitor 13.

The server S1 in the face detection system 100 according to the embodiment associates information of an image capturing time point with the position information at which the face cut-out image is captured in each generated face cut-out image, and transmits the associated information to the terminal device P1. The terminal device P1 displays a pair of the thumbnail image and the information of the image capturing time point side by side for each piece of position information (specifically, places displayed in a list form in the place selection field PS) on the monitor 13. Accordingly, the face detection system 100 according to the embodiment can rearrange and display the thumbnail data associated with the face cut-out image in each position information (place). Therefore, the user can easily confirm the image capturing time point at which the thumbnail image (face cut-out image) is captured and the position information (place) at which an image is captured, and thus the monitoring service or the investigation service can be accomplished more efficiently.

The terminal device P1 in the face detection system 100 according to the embodiment calculates a distance between a position shown by the position information (place) for each face cut-out image and a starting point position based on information of the starting point position designated by user operation, rearranges the thumbnail images and displays the thumbnail images on the monitor 13 based on the calculated distance. Accordingly, the face detection system 100 according to the embodiment can display that the user can intuitively grasp that a person corresponding to each of the plurality of face cut-out images is a person detected near the starting point position designated by the user operation or a person detected farther from the starting point position.

The server S1 in the face detection system 100 according to the embodiment extracts a face cut-out image of a person the same or similar to the person in the registered face image from each of one or more face cut-out images based on each of registered face images of a plurality of persons recorded in advance, generates the alert notification screen AR including the extracted face cut-out image and the registered face image, and transmits the alert notification screen AR to the terminal device P1. The terminal device P1 displays the received alert notification screen AR on the monitor 13. Accordingly, in a case where the face detection system 100 according to the embodiment determines that there is a face cut-out image to be collated with the registered face image of the target among the plurality of face cut-out images detected from one or more recorded video data files, the face detection system 100 can notify the user that the face image of the person to be collated with the registered face image of the target has been detected. Accordingly, the user can search for a target from each of the plurality of face cut-out images detected from one or more recorded video data files without executing search due to input of a face image by registering a face image in the blacklist database DB in advance, and thus a monitoring service or an investigation service can be accomplished more efficiently.

Although various embodiments have been described with reference to the accompanying drawings, the present disclosure is not limited to such examples. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present invention. Each constituent element in various embodiments described above may be combined optionally in the range without deviating from the spirit of the invention.

INDUSTRIAL APPLICABILITY

The present disclosure is useful as presentation of a face detection system that visualizes a face image of a person reflected on at least one recorded video data file captured in the past and an image capturing time point at which an image of the person is captured in association with each other, and efficiently supports a monitoring service for the person.

What is claimed is:
1. A face detection system, comprising:
a terminal device that is capable of acquiring at least two recorded video data files; and
a server that is communicably connected to the terminal device,
wherein the terminal device acquires the two recorded video data files selected by a first user operation and transmits the two recorded video data files to the server,
the server converts the received two recorded video data files into recorded video data one and recorded video data two having a predetermined format, detects one or more faces of one or more persons based on the recorded video data one and the recorded video data two, generates one or more face cut-out images by cutting out regions of the detected faces, associates information of image capturing time points at which the one or more persons corresponding to the face cut-out images are captured with the face cut-out images, and transmits the associated information to the terminal device,
the terminal device displays thumbnail images of the received face cut-out images and information of the image capturing time points from the recorded video data one side by side with thumbnail images of the received face cut-out images and information of the image capturing time points from the recorded video data two along a same time line on a monitor,
the terminal device, in response to a second user operation, rearranges the thumbnail images of the received face cut-out images from the recorded video data one and from the recorded video data two based on a plurality of places, and displays the rearranged thumbnail images along the same time line on the monitor, and
each of the plurality of places is displayed side by side along the same time line on the monitor, and the rearranged thumbnail images are displayed in association with a corresponding one of the plurality of places.
2. The face detection system according to claim 1, wherein the two recorded video data files are captured at different image capturing time points for a predetermined time or more.

3. The face detection system according to claim 1, wherein
the two recorded video data files are captured and recorded by cameras provided on moving objects.

4. The face detection system according to claim 1, wherein
the server extracts a plurality of face cut-out images determined to be of a same or similar person from the face cut-out images, generates a similar face image group including each of the plurality of extracted face cut-out images, and transmits the similar face image group to the terminal device, and
the terminal device displays at least one thumbnail image of the face cut-out images included in the received similar face image group and corresponding image capturing time point information on the monitor, the thumbnail image and the corresponding image capturing time point information being surrounded with a frame.

5. The face detection system according to claim 4, wherein
the server determines whether or not each of the plurality of extracted face cut-out images is continuously captured for a predetermined time or more at a same place, and
in a case where the server determines that each of the plurality of extracted face cut-out images is continuously captured for the predetermined time or more at the same place, the server generates a staying face image group including each of a plurality of face cut-out images captured during the predetermined time in the similar face image group, and transmits the staying face image group to the terminal device, and
the terminal device displays a face cut-out image captured first and a face cut-out image captured last during the predetermined time in the received staying face image group side by side on the monitor.

6. The face detection system according to claim 1, wherein
the server receives live videos captured by cameras, further converts each of the received live videos into recorded live video data having the predetermined format, and detects a face of the one or more persons from the converted recorded live video data.

7. The face detection system according to claim 1, wherein
the terminal device transmits a face image for search including a face region of a person designated by a third user operation to the server, and
the server extracts a face cut-out image of a person same as or similar to the person in the face image for search from the face cut-out images based on the received face image for search, and transmits the extracted face cut-out image to the terminal device.

8. The face detection system according to claim 1, wherein
the server associates information of the image capturing time points with position information, at which the face cut-out images are captured, for each of the generated face cut-out images, and transmits the associated information to the terminal device, and
the terminal device displays pairs of the thumbnail images and the image capturing time point information side by side on the monitor.

9. The face detection system according to claim 8, wherein
the terminal device calculates, based on information of a starting point position designated by a third user operation, a distance between a position indicated by the position information of each of the face cut-out images and the starting point position, and
the terminal device rearranges the thumbnail images based on the calculated distance and displays the thumbnail images on the monitor.

10. The face detection system according to claim 1, wherein
the server extracts, based on each of registered face images of a plurality of persons recorded in advance, a face cut-out image of a person same as or similar to one of the plurality of persons in the registered face images from each of the face cut-out images, and generates an alert notification screen including the extracted face cut-out image and a corresponding registered face image, and transmits the alert notification screen to the terminal device, and
the terminal device displays the received alert notification screen on the monitor.

11. The face detection system according to claim 1, wherein
the terminal device, in response to a third user operation, displays the rearranged thumbnail images along the same time line for a predetermined time period, with the predetermined time period being specified by the third user operation.

12. The face detection system according to claim 1, wherein
the terminal device, in response to a third user operation, displays at least one of the rearranged thumbnail images determined to be of a same or similar person along the same time line in association with the corresponding one of the plurality of places.

13. The face detection system according to claim 1, wherein
the terminal device, in response to a third user operation, displays at least one of the rearranged thumbnail images determined to be from at least one selected place of the plurality of places along the same time line in association with the at least one selected place.

14. A face detection method of a face detection system, the face detection system including a terminal device capable of acquiring at least one two recorded video data files and a server communicably connected to the terminal device, the face detection method comprising:
acquiring, in the terminal device, the two recorded video data files selected by a first user operation;
transmitting the two recorded video data files from the terminal device to the server;
converting, in the server, the received two recorded video data files into recorded video data one and recorded video data two having a predetermined format;
detecting, in the server, one or more faces of one or more persons based on the converted recorded video data one and the recorded video data two;
generating, in the server, one or more face cut-out images by cutting out regions of the detected faces;
associating, in the server, information of image capturing time points at which the one or more persons corresponding to the face cut-out images are captured with the face cut-out images;
transmitting the associated information from the server to the terminal device;

displaying, in the terminal device, thumbnail images of the received face cut-out images and information of the image capturing time points from the recorded video data one side by side with thumbnail images of the received face cut-out images and information of the image capturing time points from the recorded video data two along a same time line on a monitor; and rearranging, in response to a second user operation, the thumbnail images of the received face cut-out images from the recorded video data one and from the recorded video data two based on a plurality of places, and displaying the rearranged thumbnail images along the same time line on the monitor, wherein each of the plurality of places is displayed side by side along the same time line on the monitor, and the rearranged thumbnail images are displayed in association with a corresponding one of the plurality of places.

15. A face detection system, comprising:

a terminal device that is capable of acquiring at least one recorded video data file; and a server that is communicably connected to the terminal device, wherein the terminal device acquires the recorded video data file selected by a user operation and transmits the recorded video data file to the server, the server converts the received recorded video data file into recorded video data having a predetermined format, detects a face of one or more persons based on the converted recorded video data, generates one or more face cut-out images by cutting out a region of the detected face, associates information of an image capturing time point at which a person corresponding to the face cut-out image is captured with the face cut-out image, and transmits the associated information to the terminal device, the terminal device displays a thumbnail image of the received face cut-out image and information of the image capturing time point side by side in a time series on a monitor, the server extracts a plurality of face cut-out images determined to be of a same or similar person from the one or more face cut-out images, generates a similar face image group including each of the plurality of extracted face cut-out images, and transmits the similar face image group to the terminal device, the terminal device displays at least one thumbnail image of the one or more face cut-out images included in the received similar face image group and corresponding image capturing time point information on the monitor, the thumbnail image and the corresponding image capturing time point information being surrounded with a frame, the server determines whether or not each of the plurality of extracted face cut-out images is continuously captured for a predetermined time or more at a same place, in a case where the server determines that each of the plurality of extracted face cut-out images is continuously captured for the predetermined time or more at the same place, the server generates a staying face image group including each of a plurality of face cut-out images captured during the predetermined time in the similar face image group, and transmits the staying face image group to the terminal device, and the terminal device displays a face cut-out image captured first and a face cut-out image captured last during the predetermined time in the received staying face image group side by side on the monitor.

16. A face detection system, comprising:

a terminal device that is capable of acquiring at least one recorded video data file; and a server that is communicably connected to the terminal device, wherein the terminal device acquires the recorded video data file selected by a user operation and transmits the recorded video data file to the server, the server converts the received recorded video data file into recorded video data having a predetermined format, detects a face of one or more persons based on the converted recorded video data, generates one or more face cut-out images by cutting out a region of the detected face, associates information of an image capturing time point at which a person corresponding to the face cut-out image is captured with the face cut-out image, and transmits the associated information to the terminal device, the terminal device displays a thumbnail image of the received face cut-out image and information of the image capturing time point side by side in a time series on a monitor, the server associates information of the image capturing time point with position information, at which each of the face cut-out images is captured, for each of the generated face cut-out images, and transmits the associated information to the terminal device, the terminal device displays a pair of the thumbnail image and the image capturing time point information side by side for each of the position information on the monitor, the terminal device calculates, based on information of a starting point position designated by the user operation, a distance between a position indicated by the position information of each of the face cut-out images and the starting point position, and the terminal device rearranges the thumbnail image based on the calculated distance and displays the thumbnail image on the monitor.

* * * * *